(12) United States Patent
Rice et al.

(10) Patent No.: US 11,430,331 B2
(45) Date of Patent: Aug. 30, 2022

(54) POWER AND THERMAL MANAGEMENT SYSTEMS AND METHODS FOR AUTONOMOUS VEHICLES

(71) Applicant: UATC, LLC, San Francisco, CA (US)

(72) Inventors: David Patrick Rice, Wexford, PA (US); Scott Klaus Boehmke, Wexford, PA (US)

(73) Assignee: UATC, LLC, Mountain View, CA (US)

( * ) Notice: Subject to any disclaimer, the term of this patent is extended or adjusted under 35 U.S.C. 154(b) by 642 days.

(21) Appl. No.: 15/722,346

(22) Filed: Oct. 2, 2017

(65) Prior Publication Data

US 2019/0080602 A1 Mar. 14, 2019

Related U.S. Application Data

(60) Provisional application No. 62/555,895, filed on Sep. 8, 2017.

(51) Int. Cl.
| | | |
|---|---|---|
| *G08G 1/0967* | (2006.01) | |
| *B60H 1/00* | (2006.01) | |
| *G05D 1/00* | (2006.01) | |

(52) U.S. Cl.
CPC ... *G08G 1/096725* (2013.01); *B60H 1/00764* (2013.01); *B60H 1/00878* (2013.01);
(Continued)

(58) Field of Classification Search
CPC .......... G08G 1/096725; B60H 1/00878; B60H 1/00764; G05D 1/0088; G05D 2201/0213; B60L 2240/36
See application file for complete search history.

(56) References Cited

U.S. PATENT DOCUMENTS

| 4,408,714 A | 10/1983 | Kobayashi |
|---|---|---|
| 4,741,477 A | 5/1988 | Ito |

(Continued)

FOREIGN PATENT DOCUMENTS

| CN | 101900393 | 12/2010 |
|---|---|---|
| CN | 102101426 | 6/2011 |

(Continued)

OTHER PUBLICATIONS

International Search Report and Written Opinion for PCT/US2016/067718, dated Mar. 20, 2017 10 pages.
(Continued)

*Primary Examiner* — Donald J Wallace
(74) *Attorney, Agent, or Firm* — Dority & Manning, P.A.

(57) ABSTRACT

Systems and methods for power and thermal management of autonomous vehicles are provided. In one example embodiment, a computing system includes processor(s) and one or more tangible, non-transitory, computer readable media that collectively store instructions that when executed by the processor(s) cause the computing system to perform operations. The operations include obtaining data associated with an autonomous vehicle. The operations include identifying one or more vehicle parameters associated with the autonomous vehicle based at least in part on the data associated with the autonomous vehicle. The operations include determining a modification to one or more operating characteristics of one or more systems onboard the autonomous vehicle based at least in part on the one or more vehicle parameters. The operations include controlling a heat generation of at least a portion of the autonomous vehicle via implementation of the modification of the operating characteristic(s) of the system(s) onboard the autonomous vehicle.

20 Claims, 6 Drawing Sheets

(52) U.S. Cl.
CPC ........ *G05D 1/0088* (2013.01); *B60L 2240/36* (2013.01); *G05D 2201/0213* (2013.01)

(56) References Cited

U.S. PATENT DOCUMENTS

| | | | |
|---|---|---|---|
| 5,537,956 A | 7/1996 | Rennfeld | |
| 5,590,540 A | 1/1997 | Ikeda | |
| 5,756,157 A | 5/1998 | Kannan | |
| 6,021,371 A | 2/2000 | Fultz | |
| 6,112,807 A | 9/2000 | Dage | |
| 6,144,954 A * | 11/2000 | Li | G05B 19/0426 706/62 |
| 6,238,725 B1 | 5/2001 | Bush | |
| 6,282,911 B1 | 9/2001 | Watanabe | |
| 6,360,835 B1 | 3/2002 | Skala | |
| 6,367,272 B1 | 4/2002 | Zeng | |
| 6,394,207 B1 | 5/2002 | Skala | |
| 6,606,251 B1 | 8/2003 | Kenny, Jr. | |
| 6,622,500 B1 | 9/2003 | Archibald | |
| 7,103,460 B1 * | 9/2006 | Breed | B60C 23/0408 701/29.1 |
| 7,191,858 B2 | 3/2007 | Vanderwees | |
| 7,404,461 B2 | 7/2008 | Varenne | |
| 7,424,868 B2 | 9/2008 | Reckels | |
| 8,373,099 B2 | 2/2013 | Lifson | |
| 8,402,776 B2 | 3/2013 | Johnston | |
| 8,599,001 B2 | 12/2013 | Schofield | |
| 8,820,351 B1 | 9/2014 | Harrington | |
| 9,219,295 B2 | 12/2015 | Weng | |
| 9,227,482 B2 | 1/2016 | DiGasbarro | |
| 9,274,525 B1 * | 3/2016 | Ferguson | B60K 31/0008 |
| 9,820,409 B1 | 11/2017 | Ross | |
| 9,869,982 B1 | 1/2018 | Clidaras | |
| 2007/0261648 A1 * | 11/2007 | Reckels | F01P 7/167 123/41.12 |
| 2008/0023248 A1 | 1/2008 | Bradley | |
| 2008/0102758 A1 * | 5/2008 | Camuffo | H03G 3/3042 455/73 |
| 2008/0112571 A1 | 5/2008 | Bradicich | |
| 2008/0139102 A1 | 6/2008 | Major | |
| 2008/0186670 A1 | 8/2008 | Lyon | |
| 2008/0251235 A1 | 10/2008 | Zhou | |
| 2008/0271878 A1 | 11/2008 | Harvey | |
| 2009/0020620 A1 | 1/2009 | Douarre | |
| 2009/0071178 A1 | 3/2009 | Major | |
| 2009/0138544 A1 | 5/2009 | Wegenkittl | |
| 2009/0145674 A1 | 6/2009 | Lee | |
| 2009/0225189 A1 * | 9/2009 | Morin | H04N 5/347 348/229.1 |
| 2009/0301125 A1 | 12/2009 | Myles | |
| 2010/0032150 A1 | 2/2010 | Determan | |
| 2010/0100306 A1 | 4/2010 | Gamache | |
| 2010/0230505 A1 | 9/2010 | Ribadeneira | |
| 2010/0262301 A1 | 10/2010 | Schwartz | |
| 2010/0292976 A1 | 11/2010 | Newcombe | |
| 2010/0305794 A1 | 12/2010 | Foster | |
| 2010/0316255 A1 | 12/2010 | Mathony | |
| 2011/0114739 A1 | 5/2011 | Misumi | |
| 2011/0154324 A1 | 6/2011 | Pagan | |
| 2011/0246023 A1 | 10/2011 | Lockwood | |
| 2011/0295451 A1 * | 12/2011 | Fassnacht | B60W 10/04 701/22 |
| 2012/0087088 A1 | 4/2012 | Killion | |
| 2012/0143430 A1 | 6/2012 | Broggi | |
| 2012/0180979 A1 | 7/2012 | Harrington | |
| 2012/0205088 A1 | 8/2012 | Morisita | |
| 2012/0316711 A1 | 12/2012 | Christian | |
| 2013/0054059 A1 * | 2/2013 | Qian | H02H 7/222 701/22 |
| 2013/0091348 A1 * | 4/2013 | Kwon | G05B 15/02 713/100 |
| 2013/0238233 A1 | 9/2013 | Kim | |
| 2013/0255601 A1 | 10/2013 | Gooden | |
| 2013/0261942 A1 * | 10/2013 | Mcquade | F02D 29/02 701/115 |
| 2013/0291637 A1 * | 11/2013 | Dorner | G01C 1/00 73/504.08 |
| 2013/0306276 A1 | 11/2013 | Duchesneau | |
| 2014/0157803 A1 | 6/2014 | Pebley | |
| 2014/0189390 A1 * | 7/2014 | Gough | G06F 1/206 713/320 |
| 2014/0217080 A1 | 8/2014 | Hoke | |
| 2014/0229059 A1 | 8/2014 | Surnilla | |
| 2014/0260233 A1 | 9/2014 | Giovanardi | |
| 2014/0350768 A1 | 11/2014 | Filippov | |
| 2014/0371924 A1 | 12/2014 | Kodama | |
| 2015/0245539 A1 | 8/2015 | Pelletier | |
| 2015/0251741 A1 | 9/2015 | Cantwell | |
| 2015/0316334 A1 | 11/2015 | Chainer | |
| 2015/0323940 A1 | 11/2015 | Venkatesan | |
| 2016/0120019 A1 | 4/2016 | Shedd | |
| 2016/0274589 A1 * | 9/2016 | Templeton | G05D 1/0246 |
| 2016/0291653 A1 * | 10/2016 | Vootukuru | G01K 13/00 |
| 2016/0349330 A1 * | 12/2016 | Barfield, Jr. | G07C 5/008 |
| 2017/0168531 A1 | 6/2017 | Casparian | |
| 2017/0174037 A1 * | 6/2017 | Meyhofer | B60H 1/00392 |
| 2017/0264493 A1 | 9/2017 | Cencini | |
| 2017/0313158 A1 | 11/2017 | Porras | |
| 2017/0355380 A1 * | 12/2017 | Fendt | G06F 1/206 |
| 2018/0050704 A1 * | 2/2018 | Tascione | B60W 50/0205 |
| 2018/0141552 A1 * | 5/2018 | Marcicki | H01M 10/625 |
| 2018/0148036 A1 * | 5/2018 | Gaither | B60W 20/19 |
| 2018/0188726 A1 | 7/2018 | Newman | |
| 2018/0209324 A1 | 7/2018 | Schwartz | |
| 2018/0212687 A1 | 7/2018 | Westmeyer | |
| 2018/0258900 A1 | 9/2018 | Namuduri | |
| 2018/0357554 A1 | 12/2018 | Hazan | |
| 2018/0370540 A1 | 12/2018 | Yousuf | |
| 2018/0372504 A1 | 12/2018 | Singhal | |
| 2019/0031015 A1 | 1/2019 | Borud | |
| 2019/0049952 A1 * | 2/2019 | Miller | G01C 21/3492 |
| 2021/0221199 A1 * | 7/2021 | Lee | B60K 11/02 |

FOREIGN PATENT DOCUMENTS

| | | |
|---|---|---|
| CN | 103346661 | 10/2013 |
| CN | 103863136 | 6/2014 |
| CN | 104477024 | 4/2015 |
| CN | 104508274 | 4/2015 |
| CN | 104589958 | 5/2015 |
| DE | 102009048674 | 5/2010 |
| WO | WO2005053974 | 6/2005 |

OTHER PUBLICATIONS

Cerullo, "Keeping your car heater hot", Popular Science, vol. 223, No. 6, Dec. 1983, pp. 122-124.

Extended European Search Report for 16879958.3, dated Dec. 20, 2018, 7 pages.

* cited by examiner

POWER AND THERMAL MANAGEMENT SYSTEMS AND METHODS FOR AUTONOMOUS VEHICLES

PRIORITY CLAIM

The present application is based on and claims priority to U.S. Provisional Application 62/555,895 having a filing date of Sep. 8, 2017, which is incorporated by reference herein.

FIELD

The present disclosure relates generally to controlling the power consumption and thermal management of an autonomous vehicle.

BACKGROUND

An autonomous vehicle is a vehicle that is capable of sensing its environment and navigating with little to no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can navigate through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of autonomous vehicle thermal management. The method includes identifying, by a computing system including one or more computing devices, one or more vehicle parameters associated with an autonomous vehicle. The method includes determining, by the computing system, a modification to one or more operating characteristics of a sensor system of the autonomous vehicle based at least in part on the one or more vehicle parameters. The method includes controlling, by the computing system, a heat generation of the sensor system of the autonomous vehicle via implementation of the modification of the one or more operating characteristics of the sensor system.

Another example aspect of the present disclosure is directed to a computing system for autonomous vehicle thermal management. The computing system includes one or more processors and one or more tangible, non-transitory, computer readable media that collectively store instructions that when executed by the one or more processors cause the computing system to perform operations. The operations include obtaining data associated with an autonomous vehicle. The data is indicative of at least one of a future action to be performed by the autonomous vehicle, a future geographic area in which the autonomous vehicle is to be located, or a weather condition to be experienced by the autonomous vehicle. The operations include identifying one or more vehicle parameters associated with the autonomous vehicle based at least in part on the data associated with the autonomous vehicle. The operations include determining a modification to one or more operating characteristics of one or more systems onboard the autonomous vehicle based at least in part on the one or more vehicle parameters. The operations include controlling a heat generation of at least a portion of the autonomous vehicle via implementation of the modification of the one or more operating characteristics of the one or more systems onboard the autonomous vehicle.

Yet another example aspect of the present disclosure is directed to an autonomous vehicle. The autonomous vehicle includes one or more processors and one or more tangible, non-transitory, computer readable media that collectively store instructions that when executed by the one or more processors cause the autonomous vehicle to perform operations. The operations include obtaining data associated with the autonomous vehicle. The operations include identifying one or more vehicle parameters associated with an autonomous vehicle based at least in part on the data associated with the autonomous vehicle. The operations include determining a modification to one or more operating characteristics of one or more systems onboard the autonomous vehicle based at least in part on the one or more vehicle parameters. The one or more systems include at least one of a sensor system of the autonomous vehicle or a motion planning system of the autonomous vehicle. The operations include controlling a heat generation of at least a portion of the autonomous vehicle via implementation of the modification of the one or more operating characteristics of the one or more systems onboard the autonomous vehicle.

Other example aspects of the present disclosure are directed to systems, methods, vehicles, apparatuses, tangible, non-transitory computer-readable media, and memory devices for predicting object motion and controlling autonomous vehicles with respect to the same.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
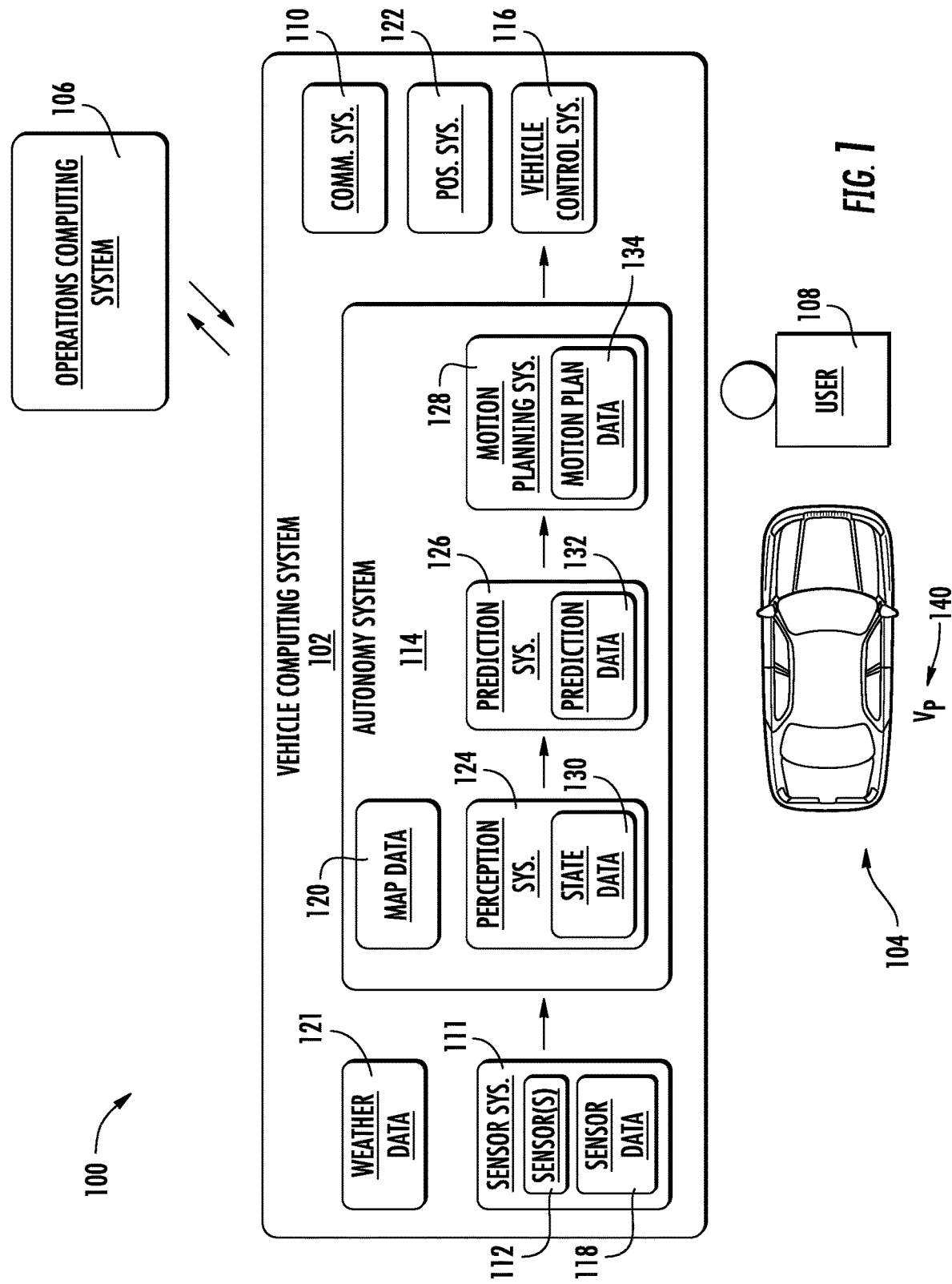
FIG. 1 depicts an example system overview according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to selectively operating one or more systems of an autonomous vehicle for improved power consumption and thermal management of the autonomous vehicle. For instance, an autonomous vehicle can include an onboard vehicle computing system that includes a variety of computing devices. As the computing devices perform various tasks (e.g., data processing for autonomous operation of the vehicle), the devices generate heat that can affect the operation of the autonomous vehicle due to hardware heating. For instance, continuous operation of the vehicle's sensor system while the autonomous vehicle is slowing down and/or stopped can increase the temperature of the autonomous vehicle due to the lack of airflow from the vehicle's motion. In accordance with the present disclosure, the vehicle's onboard computing system can help control the vehicle's temperature by selectively operating certain systems onboard the autonomous vehicle (e.g., reducing the power consumption) and, ultimately, the heat generated by those systems. Moreover, the vehicle computing system can predictively reduce the power consumption/heat generation of these systems (e.g., while the vehicle is in motion) based on parameters to occur at a future point in time. The vehicle computing system can identify one or more vehicle parameters associated with the autonomous vehicle to determine the circumstances faced/to be faced by the vehicle, determine a modification to the system(s) onboard the vehicle, and implement the modification to control the vehicle's temperature, heat generation, etc. By way of example, the vehicle computing system can evaluate the motion plan of the autonomous vehicle to determine that the vehicle will be stopping at a stop sign in five hundred feet. As the autonomous vehicle approaches the stop sign, the vehicle computing system can reduce the frequency with which the vehicle's sensor system acquires image data associated with the vehicle's surroundings. This can decrease the power dissipated and thereby the heat generated by the sensor system. Accordingly, the vehicle computing system can predictively manage the systems onboard the autonomous vehicle to control the vehicle's heat generation, temperature, etc. This can help reduce potential overheating of the autonomous vehicle while also avoiding the need for more complex cooling systems.

More particularly, an autonomous vehicle can be a ground-based autonomous vehicle (e.g., car, truck, bus, etc.), aerial vehicle, or another type of vehicle that can operate with minimal and/or no interaction from a human operator located within the vehicle or at a remote location. The autonomous vehicle can include a vehicle computing system located onboard the autonomous vehicle to help control the autonomous vehicle. The vehicle computing system is located onboard the autonomous vehicle, in that the vehicle computing system is located on or within the autonomous vehicle. The vehicle computing system can include a sensor system, an autonomy system (e.g., for determining and planning autonomous vehicle navigation/motion), one or more vehicle control systems (e.g., for controlling braking, steering, powertrain), etc.

The sensor system can include one or more sensors that are configured to acquire sensor data associated with surrounding environment of the autonomous vehicle (e.g., within a field of view of the sensor(s)). The sensor(s) can include, for example, cameras, a Light Detection and Ranging (LIDAR) system, a Radio Detection and Ranging (RADAR) system, and/or other types of sensors. The sensor data can include image data, LIDAR data, RADAR data, etc.

The sensor data can be processed to help the autonomous vehicle perceive its surrounding environment and generate an appropriate motion plan through such surrounding environment. For example, the vehicle computing system (e.g., the autonomy system) can include a perception system, a prediction system, and a motion planning system. The perception system can be configured to perceive object(s) (e.g., vehicles, pedestrians, bicyclists, etc.) within the surrounding environment of the autonomous vehicle based at least in part on the sensor data. The prediction system can be configured to predict a motion of the perceived object(s). The motion planning system can be configured to plan the motion of the autonomous vehicle, for example, with respect to the object(s) and the predicted motion of the objects. The motion plan can be indicative of one or more future vehicle action(s) (e.g., acceleration adjustments, speed adjustments, steering adjustments, etc.) to be performed by the autonomous vehicle. The vehicle computing system can utilize the vehicle control system(s) to implement the determined motion plan.

The vehicle computing system can help control the temperature of the autonomous vehicle by selectively operating one or more of the systems onboard the autonomous vehicle. To do so, the vehicle computing system can determine whether the appropriate circumstances existence in order for the autonomous vehicle to modify the operating characteristic(s) of its onboard system(s). If so, the vehicle computing system can help control the temperature of the autonomous vehicle by reducing and/or limiting the power consumption of one or more of these systems.

The vehicle computing system can identify one or more vehicle parameters associated with the autonomous vehicle to determine whether it is safe and/or appropriate to modify the power consumption of the system(s) onboard the autonomous vehicle. For instance, the vehicle computing system can obtain data associated with the autonomous vehicle. Such data can include data indicative of the vehicle's current operating conditions. Additionally, or alternatively, such data can include data indicative of a motion plan of the autonomous vehicle (e.g., that indicates future vehicle actions). The data associated with the autonomous vehicle can also, or alternatively, include map data. The map data can be indicative of current and/or future geographic locations in which the autonomous vehicle is/will be located, information associated with a particular travel way, etc. Additionally, or alternatively, the data associated with the autonomous vehicle can include weather data (e.g., indicative of current and/or future weather condition(s)), sensor data, and/or other types of data.

The vehicle computing system can identify the vehicle parameter(s) associated with the autonomous vehicle based at least in part on the data associated with the autonomous vehicle. For instance, the vehicle computing system can process this data to determine whether certain vehicle parameters exist (or will exist) such that one or more systems onboard the autonomous vehicle can be modified (e.g., to a reduced power state). For example, the vehicle computing system can process the data indicative of the vehicle's current operating conditions to determine a current state (e.g., speed, heading, acceleration, etc.) of the vehicle. The vehicle computing system can process the data indicative of the motion plan of the autonomous vehicle to determine a future vehicle action to be performed by the autonomous vehicle. The vehicle computing system can identify one or more vehicle parameters (e.g., such as future vehicle speed, heading, acceleration, etc.) based at least in part on the future vehicle action (e.g., a pull over action for a transportation service, turn, etc.). In another example, the vehicle computing system can evaluate the map data to determine vehicle parameter(s) such as, for example, current and/or future: travel way condition(s) (e.g., obstructions, roadwork, etc.), travel way type (e.g., urban city streets, rural highway, etc.), travel way geometry (e.g., slope, curvature, etc.), crowd density, traffic pattern(s), and/or other parameters. Additionally, or alternatively, the vehicle computing system can process the weather data to determine the weather conditions that the vehicle is currently experiencing and/or will experience in the future. In some implementations, the vehicle computing system can process the sensor data to identify one or more vehicle parameters (e.g., road type, road conditions, weather conditions, etc.).

The vehicle computing system can determine a modification to one or more operating characteristics of the one or more systems onboard the autonomous vehicle based at least in part on the vehicle parameters. In some implementations, the modification can aim to reduce the heat generation of the respective system by adjusting the operating characteristics of that system. This can include an adjustment to how the system's functions are operated (e.g., via a software modification), rather than a physical adjustment of the system hardware. In some implementations, the vehicle computing system can include an algorithm (e.g., a rule(s)-based algorithm) that is stored in an accessible memory onboard the autonomous vehicle. The vehicle parameter(s) can be provided as input into the algorithm. Based on the vehicle parameter(s), the algorithm can indicate which of the system(s) onboard the autonomous vehicle should be modified (e.g., to reduce that system's heat generation) and how the respective system(s) should be modified (e.g., which operating characteristics to modify). In some implementations, the system modification can be determined at least in part from a model, such as a machine-learned model. For example, the machine-learned model can be or can otherwise include one or more various model(s) such as, for example, models using boosted random forest techniques, neural networks (e.g., deep neural networks), or other multi-layer non-linear models. Neural networks can include recurrent neural networks (e.g., long short-term memory recurrent neural networks), feed-forward neural networks, and/or other forms of neural networks. For instance, supervised training techniques can be performed to train the model (e.g., using previous logs of autonomous vehicle operations) to determine which systems and types of modifications were most effective in controlling the heat generation of a vehicle system, the temperature of the vehicle, power consumption, etc. The input data for the model can include, for example, the vehicle parameters, as described herein. The machine-learned model can provide, as an output, data indicative of one or more recommended modifications to one or more operating characteristics of one or more systems onboard the autonomous vehicle.

The vehicle computing system can determine system modifications for current and/or future implementation on the autonomous vehicle. The modification can be determined while the autonomous vehicle is in motion (e.g., rather than when parked). In some implementations, the vehicle computing system can determine a current modification for a system onboard the autonomous vehicle based at least in part on the current operating conditions of the vehicle. By way of example, the vehicle computing system can determine that the vehicle's current speed is decreasing and/or below a threshold and that the vehicle is travelling in a geographic area with a low crowd density (e.g., in a rural environment without pedestrians). Given these vehicle parameter(s), the vehicle computing system can determine that the vehicle can safely operate below the maximum capability of the sensor system. As such, the vehicle computing system can determine a modification to the operating characteristic(s) of the sensor system. The operating characteristic(s) associated with sensor system can include, for example, data acquisition characteristics (e.g., associated with the collection of sensor data by a vehicle sensor) and/or data processing characteristics (e.g., associated with the processing of such sensor data). For example, the vehicle computing system can determine (e.g., using the rule(s)-based algorithm, machine-learned model, etc.) that one or more of the vehicle's sensors (e.g., cameras) should be modified to utilize a lower frame rate and/or acquire images a lower rate. This can allow the sensor system to consume less power for image acquisition/processing and, ultimately, to generate less heat. In another example, the vehicle computing system can determine that the vehicle is currently travelling on a relatively flat travel way (e.g., road). The vehicle computing system can determine a modification to the vehicle's sensor system to cause a decrease in the power consumption of the sensor system while the vehicle is on the flat travel way. For instance, the vehicle computing system can determine that the vehicle's sensors can utilize a smaller window of interest (e.g., +/−two degrees) for the flat travel way, while still maintaining safe operation of the vehicle. This can allow the sensor system to process less image data and, thus, decrease the power consumed for such processing, while also generating less heat.

In some implementations, the vehicle computing system can predictively reduce the power consumption of a system of the autonomous vehicle based on future conditions that are expected by the vehicle. By way of example, the vehicle computing system can determine that the autonomous vehicle will decelerate to a stopped position at a future point in time based at least in part on the vehicle's motion plan (e.g., which indicates the future stopping action). The vehicle computing system can preemptively determine that as the vehicle decelerates and/or reaches the stopped position the operating characteristic(s) of the sensor system of the autonomous vehicle can be modified to control the system's power consumption and heat generation. For example, the vehicle computing system can determine that once the vehicle eventually reaches a certain location, point in time, speed, etc. the sensor system can sub-sample the sensor data to decrease the power needed for image processing. In some implementations, the vehicle computing system can determine that one or more of the vehicle's sensors can be disabled (e.g., turned-off and/or otherwise prevented from acquiring sensor data). Either approach can lead to less heat generation from the sensor system.

In another example, the vehicle computing system can determine that the autonomous vehicle will be located within a future geographic area (e.g., a rural country road) that has a low level of traffic and a low crowd density (e.g., based on the map data, vehicle route, motion plan, etc.). Accordingly, the vehicle computing system can determine a modification to the operating characteristic(s) of the sensor system of the autonomous vehicle to be implemented when the vehicle is within the future geographic area, so that the sensor system consumes less power (and generates less heat). Such a modification can include, for example, reducing the resolution of the sensor data acquired via the sensor(s), adjusting the frame rate of the sensor, sub-sampling sensor data, etc. Additionally, or alternatively, the vehicle computing system can determine that the autonomous vehicle will be located within a future geographic area (e.g., a city center) that has a higher crowd density (e.g., based on the map data, motion plan, etc.). Accordingly, the vehicle computing system can determine that the sensor system should not be modified while in the future geographic area so that the vehicle can operate to the maximum capability of the vehicle's sensors.

In some implementations, the vehicle computing system can identify a current and/or future weather condition to be experienced by the autonomous vehicle. In the event that the weather condition requires optimal sensor capability (e.g., wet/icy conditions, etc.), the vehicle computing system can determine that the operating characteristic(s) of the sensor system should not be modified to reduce power consumption, heat generation, etc. under such weather conditions. In the event that the weather condition does not require maximum sensor capability (e.g., clear skies) and that it would be otherwise safe to do so, the vehicle computing system can adjust the operating characteristic(s) of the sensor system of the autonomous vehicle to decrease heat generation, power consumption, etc. (e.g., via acquisition frequency reduction, sub-sampling, etc.) while under such weather conditions. This can allow the vehicle computing system to decrease the temperature of the sensor system under such circumstances.

The vehicle computing system can determine power-saving modifications to systems onboard the autonomous vehicle other than the sensor system. For instance, the vehicle computing system can determine that the temperature of the vehicle's surrounding environment is ninety degrees Fahrenheit (e.g., based on vehicle thermometer, weather data, etc.). In such conditions, the vehicle computing system may reduce the frame-rate and/or implement sub-sampling by the sensor system. Additionally, or alternatively, the vehicle computing system can determine a modification to one or more operating characteristics of the vehicle's motion planning system. The operating characteristic(s) of the motion planning system can be characteristic(s) associated with the determination of the future action(s) of the autonomous vehicle. For example, a modification of the operating characteristic(s) can include restricting the top speed of the autonomous vehicle while the vehicle is operating at the reduced frame rate, sub-sampling, etc. Such a modification can include an adjustment of the cost data utilized by the motion planning system when planning the motion of the autonomous vehicle. For instance, the cost data can be adjusted such that the cost of exceeding the restricted speed is very high. In another example, the autonomous vehicle may only have enough thermal headway to operate the sensor(s) with a forward overhead of a particular distance (e.g., fifty meters). Accordingly, the vehicle computing system can determine a modification to the operating characteristic(s) of the motion planning system to restrict the speed of the autonomous vehicle to not exceed a speed corresponding to the stopping distance at such forward overhead (e.g., twenty-five mph). In another example, the autonomous vehicle may be stopped for an extended period of time due to emergency road construction on a highway. When the autonomous vehicle finally passes the roadwork, significant heat may be generated if the vehicle attempts to reach the appropriate speed in a short time period (e.g., due to sensor frame rate increase, additional sensor activation, etc.). The vehicle computing system can modify the operating characteristic(s) of the motion planning system such that the autonomous vehicle is caused to travel within a buffer speed/acceleration as the vehicle is getting up to speed on the highway. This can help control the power consumption of the other vehicle systems as the autonomous vehicle reaches the appropriate speed and, thus, the heat generation.

The modifications to the operating characteristic(s) of a system can be configured to adjust the system in a variety of manners. In some implementations, the operating characteristic(s) of the system(s) onboard the autonomous vehicle can be modified in a proportional manner. By way of example, in the event that the speed of the autonomous vehicle is decreasing (or will be decreasing), the frame rate of a sensor can be decreased proportionally to the decrease in vehicle speed. In some implementations, the operating characteristic(s) of the system(s) onboard the autonomous vehicle can be modified in a pre-set manner. For example, in the event that the autonomous vehicle is travelling (or will be travelling) below a certain speed threshold, in a certain weather condition, and/or under another circumstance for which its existence can be represented in a binary manner, the sensor system can begin to sub-sample the sensor data, according to a pre-determined approach that defines the particular sub-sampling type, factors, resolutions, etc.

The vehicle computing system can control the temperature of at least a portion of the autonomous vehicle via implementation of the modification of the one or more operating characteristics of the one or more systems onboard the autonomous vehicle. For instance, the vehicle computing system can control the heat generation of at least a portion of the autonomous vehicle via implementation of the modification of the operating characteristic(s) of the system(s) onboard the autonomous vehicle. For instance, the vehicle computing system can send data indicative of the determined modification (e.g., control signal(s)) to the respective system(s) onboard the autonomous vehicle (e.g., sensor system, motion planning system) to implement the modification (e.g., decrease in the frame rate, adjust a window of interest, adjust cost data, etc.). Such data can be provided while the autonomous vehicle is in motion. Moreover, such data can be sent at a current point in time to immediately implement the modification (e.g., for the vehicle's current situation) or a future point in time to implement the modification for future conditions to be experienced by the vehicle (e.g., at a future stop, flat travel way, low crowd density area, etc.). In some implementations, the system(s) of the autonomous vehicle can be configured to operate in a plurality of operating modes that include, for example, a low heat operating mode. By way of example, the sensor system can be configured to operate in a plurality of sensor operating modes that include a low heat sensor operating mode in which the sensor(s) operate at a decreased frame rate, utilize sub-sampling, etc. To implement the determined modification, the vehicle computing system can cause the sensor system to enter into the low heat sensor operating mode.

The systems and methods described herein provide a number of technical effects and benefits. For instance, the present disclosure provides an improved approach to thermal management of an autonomous vehicle. In particular, the systems and methods enable an autonomous vehicle to reduce the power consumption of the systems that are utilized by the autonomous vehicle for perceiving the surrounding environment (e.g., sensor system) and planning its motion through the surrounding environment (e.g., autonomy system, motion planning system). By doing so, the autonomous vehicle can leverage its existing onboard systems to better control the vehicle's temperature (e.g., heat generation), rather than relying on more complex (and expensive) cooling systems. This can also help avoid the difficulty associated with up-fitting such cooling hardware to an autonomous vehicle as well as the allocation of computational resources needed to run such systems. Moreover, the improved thermal management of the vehicle's onboard system can help avoid potential overheating and, thus, lead to more efficient operation of the vehicle computing system.

The systems and methods of the present disclosure also provide an improvement to vehicle computing technology, such as autonomous vehicle computing technology. The systems and methods of the present disclosure can control the heat generation of an autonomous vehicle by selectively modifying its onboard systems (e.g., the associated power consumption) when it is most appropriate. For instance, the vehicle computing system can obtain data associated with the autonomous vehicle. The data can be indicative of current and/or future operating conditions of the autonomous vehicle. For instance, the data can be indicative of a current or future action to be performed by the autonomous vehicle, a current or future geographic area in which the vehicle is to be located, a weather condition experienced (or to be experienced) by the autonomous vehicle, etc. The vehicle computing system can identify one or more vehicle parameters associated with an autonomous vehicle based at least in part on the data associated with the autonomous vehicle. As described herein, the vehicle parameter(s) can include, for example, current and/or future: vehicle speed(s), vehicle action(s), travel way condition(s) (e.g., obstructions, roadwork, etc.), travel way type(s) (e.g., urban city streets, rural highway, etc.), travel way geometry (e.g., slope, curvature, etc.), crowd density, traffic pattern(s), weather conditions, etc. The vehicle computing system can determine a modification to one or more operating characteristics of one or more systems onboard the autonomous vehicle based at least in part on the vehicle parameters. The system(s) can be those associated with the autonomous operation of the vehicle such as, for example, the sensor system, motion planning system, etc. In some implementations, implementing the modification can cause a decrease in a power consumption of that respective system. The vehicle computing system can thereby control a temperature (e.g., heat generation) of at least a portion of the autonomous vehicle via implementation of the modification. In this way, the vehicle computing system can evaluate the appropriate vehicle parameters to ensure that the autonomous vehicle can safely modify the vehicle's onboard autonomy operations to control vehicle system heat generation when appropriate.

Additionally, the systems and methods of the present disclosure can be implemented while the autonomous vehicle is in motion to scale down power usage while the vehicle is in motion (e.g., rather than parked). This can be particularly helpful for autonomous vehicles that are equipped for both high-speed and low-speed operation. For example, when an autonomous vehicle is operating (e.g., driving) at low-speed, high-speed sensors can be disengaged and/or their data collection may be throttled for power consumption.

Moreover, the vehicle computing system can leverage its knowledge of the vehicle's future actions/operating conditions (e.g., via motion planning data) to predictively determine system modifications that will be advantageous for thermal management at a future point in time. This can enable the autonomous vehicle to preemptively control the temperature (e.g., heat generation) of the vehicle computing system, improving the ability to avoid potential thermal harm to its computing components (e.g., from overheating). As described herein, the improved thermal management can allow for more efficient operation of the vehicle's computing system (e.g., improved processing), under circumstances that still allow for the safe operation of the autonomous vehicle.

With reference now to the FIGS., example embodiments of the present disclosure will be discussed in further detail. FIG. 1 depicts an example system 100 according to example embodiments of the present disclosure. The system 100 can include a vehicle computing system 102 associated with a vehicle 104 and an operations computing system 106 that is remote from the vehicle 104.

In some implementations, the vehicle 104 can be associated with an entity (e.g., a service provider, owner, manager). The entity can be one that provides one or more vehicle service(s) to a plurality of users via a fleet of vehicles that includes, for example, the vehicle 104. In some implementations, the entity can be associated with only vehicle 104 (e.g., a sole owner, manager). In some implementations, the operations computing system 106 can be associated with the entity. The vehicle 104 can be configured to provide one or more vehicle services to one or more users 108 (e.g., services offered by the entity). The vehicle service(s) can include transportation services (e.g., rideshare services in which a user 108 rides in the vehicle 104 to be transported), courier services, delivery services, and/or other types of services. The vehicle service(s) can be offered to users 108 by the entity, for example, via a software application (e.g., a mobile phone software application). In some implementations, the entity can utilize the operations computing system 106 to coordinate and/or manage the vehicle 104 (and its associated fleet, if any) to provide the vehicle services to a user 108.

The operations computing system 106 can include one or more computing devices that are remote from the vehicle 104 (e.g., located off-board the vehicle 104). For example, such computing device(s) can be components of a cloud-based server system and/or other type of computing system that can communicate with the vehicle computing system 102 of the vehicle 104. The computing device(s) of the operations computing system 106 can include various components for performing various operations and functions. For instance, the computing device(s) can include one or more processor(s) and one or more tangible, non-transitory, computer readable media (e.g., memory devices). The one or more tangible, non-transitory, computer readable media can store instructions that when executed by the one or more processor(s) cause the operations computing system 106 (e.g., the one or more processors, etc.) to perform operations and functions, such as coordinating vehicles to provide vehicle services.

The vehicle 104 can include a communications system 110 configured to allow the vehicle computing system 102 (and its computing device(s)) to communicate with other computing devices. The vehicle computing system 102 can use the communications system 110 to communicate with the operations computing system 106 and/or one or more other remote computing device(s) over one or more networks (e.g., via one or more wireless signal connections). In some implementations, the communications system 110 can allow communication among one or more of the system(s) on-board the vehicle 104. The communications system 110 can also be configured to enable the autonomous vehicle to communicate and/or otherwise receive data from other computing devices (e.g., a user device). The communications system 110 can include any suitable components for interfacing with one or more network(s), including, for example, transmitters, receivers, ports, controllers, antennas, and/or other suitable components that can help facilitate communication.

The vehicle 104 incorporating the vehicle computing system 102 can be a ground-based autonomous vehicle (e.g., car, truck, bus, etc.), an air-based autonomous vehicle (e.g., airplane, drone, helicopter, or other aircraft), or other types of vehicles (e.g., watercraft, etc.). The vehicle 104 can be an autonomous vehicle that can drive, navigate, operate, etc. with minimal and/or no interaction from a human operator. In some implementations, a human operator can be omitted from the vehicle 104 (and/or also omitted from remote control of the vehicle 104).

The vehicle 104 can be configured to operate in a plurality of vehicle operating modes. The vehicle 104 can be configured to operate in a fully autonomous (e.g., self-driving) operating mode in which the vehicle 104 can drive and navigate with no input from a user 108 present in the vehicle 104 (and/or at a remote location). The vehicle 104 can be configured to operate in a semi-autonomous operating mode in which the vehicle 104 can operate with some input from a user 108 present in the vehicle 104 (and/or at a remote location). The vehicle 104 can enter into a manual operating mode in which the vehicle 104 is fully controllable by a user 108 (e.g., human operator) and can be prohibited from performing autonomous navigation (e.g., autonomous driving). In some implementations, the vehicle 104 can implement vehicle operating assistance technology (e.g., collision mitigation system, power assist steering, etc.) while in the manual operating mode to help assist the operator of the vehicle 104. The power and thermal management systems and methods described herein can be implemented while the vehicle 104 is in any one of the plurality of vehicle operating modes.

The operating mode of the vehicle 104 can be adjusted in a variety of manners. In some implementations, the operating mode of the vehicle 104 can be selected remotely, off-board the vehicle 104. For example, an entity associated with the vehicle 104 (e.g., a service provider) can utilize the operations computing system 106 to manage the vehicle 104 (and/or an associated fleet). The operations computing system 106 can send one or more control signals to the vehicle 104 instructing the vehicle 104 to enter into, exit from, maintain, etc. an operating mode. By way of example, the operations computing system 106 can send one or more control signals to the vehicle 104 instructing the vehicle 104 to enter into the fully autonomous operating mode. In some implementations, the operating mode of the vehicle 104 can be set onboard and/or near the vehicle 104. For example, the vehicle computing system 102 can automatically determine when and where the vehicle 104 is to enter, change, maintain, etc. a particular operating mode (e.g., without user input). Additionally, or alternatively, the operating mode of the vehicle 104 can be manually selected via one or more interfaces located onboard the vehicle 104 (e.g., key switch, button, etc.) and/or associated with a computing device proximate to the vehicle 104 (e.g., a tablet operated by authorized personnel located near the vehicle 104). In some implementations, the operating mode of the vehicle 104 can be adjusted based at least in part on a sequence of interfaces located on the vehicle 104. For example, the operating mode may be adjusted by manipulating a series of interfaces in a particular order to cause the vehicle 104 to enter into a particular operating mode.

The vehicle computing system 102 can include one or more computing devices located onboard the vehicle 104. For example, the computing device(s) can be located on and/or within the vehicle 104. The computing device(s) can include various components for performing various operations and functions. For instance, the computing device(s) can include one or more processor(s) and one or more tangible, non-transitory, computer readable media (e.g., memory devices). The one or more tangible, non-transitory, computer readable media can store instructions that when executed by the one or more processor(s) cause the vehicle 104 (e.g., its computing system, one or more processors, etc.) to perform operations and functions, such as those described herein for power consumption and thermal management.

As shown in FIG. 1, the vehicle 104 can include a sensor system 111 that includes one or more sensors 112, an autonomy computing system 114, and one or more vehicle control systems 116. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel.

The sensor(s) 112 can be configured to acquire sensor data 118 associated with one or more objects that are proximate to the vehicle 104 (e.g., within a field of view of one or more of the sensor(s) 112). The sensor(s) 112 can include a LIDAR system, a RADAR system, one or more cameras (e.g., visible spectrum cameras, infrared cameras, etc.), motion sensors, and/or other types of imaging capture devices and/or sensors. The sensor data 118 can include image data, radar data, LIDAR data, and/or other data acquired by the sensor(s) 112. The object(s) can include, for example, vehicles, pedestrians, bicycles, and/or other objects. The object(s) can be located in front of, to the rear of, above, below, and/or to the side of the vehicle 104. The sensor data 118 can be indicative of locations associated with the object(s) within the surrounding environment of the vehicle 104 at one or more times. The sensor(s) 112 can provide the sensor data 118 to the autonomy computing system 114.

In addition to the sensor data 118, the vehicle computing system 102 can retrieve or otherwise obtain other types of data associated with geographic area(s) in which the objects (and/or the vehicle 104) have been, are, and/or will be located. For example, the vehicle computing system 102 can obtain map data 120 that provides detailed information about the surrounding environment of the vehicle 104. The map data 120 can be indicative of current and/or future geographic locations in which the autonomous vehicle is/will be located, information associated with a particular travel way, etc. The map data 120 can provide information regarding: the identity and location of different roadways, road segments, buildings, sidewalks, walls, or other items; the location and directions of traffic lanes (e.g., the boundaries, location, direction, etc. of a parking lane, a turning lane, a bicycle lane, or other lanes within a particular travel way); traffic control data (e.g., the location and instructions of signage, traffic lights, or other traffic control devices); the location of obstructions (e.g., roadwork, accident, etc.) and/or any other map data that provides information that assists the computing system in comprehending and perceiving its surrounding environment and its relationship thereto. In some implementations, the vehicle computing system 102 can obtain satellite imagery of a geographic area (e.g., overhead imagery) in which the object(s) and/or the vehicle 104 is located. Such satellite imagery can be provided to the vehicle computing system 102 from the operations computing system 106 and/or other computing device(s) that are remote from the vehicle 104.

Additionally, or alternatively, the vehicle computing system 102 can obtain weather data 121. The weather data 121 can be indicative of one or more past, current, and/or future weather conditions. The weather condition(s) can be associated with geographic area(s) in which the vehicle 104 is travelling and/or will be travelling. For example, the weather data 121 can be indicative of whether a particular geographic area is to experience wet, icy, snowy, dry, humid, sunny, hot, cold, and/or other weather conditions. In some implementations, the weather data 121 can be indicative of one or more times at which these weather condition(s) are expected to occur.

The vehicle 104 can include a positioning system 122. The positioning system 122 can determine a current position of the vehicle 104. The positioning system 122 can be any device or circuitry for analyzing the position of the vehicle 104. For example, the positioning system 122 can determine position by using one or more of inertial sensors, a satellite positioning system, based on IP/MAC address, by using triangulation and/or proximity to network access points or other network components (e.g., cellular towers, WiFi access points, etc.) and/or other suitable techniques. The position of the vehicle 104 can be used by various systems of the vehicle computing system 102 and/or provided to one or more remote computing device(s) (e.g., of the operations computing system 106). For example, the map data 120 can provide the vehicle 104 relative positions of the surrounding environment of the vehicle 104. The vehicle 104 can identify its position within the surrounding environment (e.g., across six axes) based at least in part on the data described herein. For example, the vehicle 104 can process the sensor data 118 (e.g., LIDAR data, camera data) to match it to a map of the surrounding environment to get an understanding of the vehicle's position within that environment.

The autonomy computing system 114 can include a perception system 124, a prediction system 126, a motion planning system 128, and/or other systems that cooperate to perceive the surrounding environment of the vehicle 104 and determine a motion plan for controlling the motion of the vehicle 104 accordingly. For example, the autonomy computing system 114 can receive the sensor data 118 from the sensor(s) 112, attempt to comprehend the surrounding environment by performing various processing techniques on the sensor data 118 (and/or other data), and generate an appropriate motion plan through such surrounding environment. The autonomy computing system 114 can control the one or more vehicle control systems 116 to operate the vehicle 104 according to the motion plan.

The autonomy computing system 114 can identify one or more objects that are proximate to the vehicle 104 based at least in part on the sensor data 118 and/or the map data 120. For example, the perception system 124 can process the sensor data 118 to detect one or more objects that are within the surrounding environment of the vehicle 104 as well as state data 130 associated therewith. The state data 130 can be indicative of at least a current or past state of an object that is within the surrounding environment of the vehicle 104. For example, the state data 130 for each object can describe an estimate of the object's current and/or past location (also referred to as position), current and/or past speed/velocity, current and/or past acceleration, current and/ or past heading, current and/or past orientation, size/footprint, class (e.g., vehicle class vs. pedestrian class vs. bicycle class), the uncertainties associated therewith, and/or other state information. The perception system 124 can provide the state data 130 to the prediction system 126.

The prediction system 126 can create predicted data 132 associated with each of the respective one or more objects proximate to the vehicle 104. The predicted data 132 can be indicative of one or more predicted future locations of each respective object that are determined as further described herein. The predicted data 132 can be indicative of a predicted trajectory (e.g., predicted path) of at least one object within the surrounding environment of the vehicle 104. For example, the predicted trajectory can indicate a path along which the respective object is predicted to travel over time. In some implementations, the predicted data 132 can indicate the speed at which the object is predicted to travel along the predicted trajectory. The prediction system 126 can provide the predicted data 132 associated with the object(s) to the motion planning system 128, for generation of a motion plan 134.

The motion planning system 128 can determine a motion plan 134 for the vehicle 104 based at least in part on the predicted data 132 (and/or other data). The motion plan 134 can include vehicle actions (e.g., future vehicle actions) with respect to the objects proximate to the vehicle 104 as well as the predicted movements. For instance, the motion planning system 128 can implement an optimization algorithm that considers cost data associated with a vehicle action as well as other objective functions (e.g., cost functions based on speed limits, traffic lights, etc.), if any, to determine optimized variables that make up the motion plan 134. By way of example, the motion planning system 128 can determine that the vehicle 104 can perform a certain action (e.g., pass an object) without increasing the potential risk to the vehicle 104 and/or violating any traffic laws (e.g., speed limits, lane boundaries, signage). The motion plan 134 can include a planned trajectory, speed, acceleration, other actions, etc. of the vehicle 104.

The motion planning system 128 can provide the motion plan 134 with data indicative of the vehicle actions, a planned trajectory, and/or other operating parameters to the vehicle control system(s) 116 to implement the motion plan 134 for the vehicle 104. For instance, the vehicle 104 can include a mobility controller configured to translate the motion plan 134 into instructions. By way of example, the mobility controller can translate a determined motion plan 134 into instructions to adjust the steering of the vehicle 104 "X" degrees, apply a certain magnitude of braking force, etc. The mobility controller can send one or more control signals to the responsible vehicle control component (e.g., braking control system, steering control system, acceleration control system) to execute the instructions and implement the motion plan 134.

The vehicle computing system 102 can be configured to can help control the temperature of the vehicle 104 by selectively operating one or more of the systems onboard the vehicle 104. For example, the vehicle computing system 102 can be configured to control the heat generation of a system onboard the vehicle 104. To do so, the vehicle computing system 102 can determine whether the appropriate circumstances existence in order for the vehicle computing system 102 to modify the operating characteristic(s) of one or more of the onboard system(s). The operating characteristic(s) can be indicative of the parameters by which a respective system performs its respective functions. The vehicle computing system 102 can help control the heat generation of the vehicle 104 by reducing and/or limiting the power consumption of one or more of these systems via modification of the system's operating characteristic(s), while the vehicle 104 is in motion. In some implementations, the vehicle 104 may increase power consumption (e.g., to the extent supplemental cooling measures are needed by an onboard cooling system).

The vehicle computing system 102 can be configured to identify one or more vehicle parameters 140 associated with the vehicle 104 to determine whether it is safe and/or appropriate to modify the heat generation, power consumption, etc. of the system(s) onboard the vehicle 104. For instance, the vehicle computing system 102 can obtain data associated with the vehicle 104. In some implementations, the data associated with the vehicle 104 can include data indicative of the vehicle's current operating conditions such as, for example, a current heading, speed, acceleration, temperature of onboard vehicle components (e.g., sensors, processors, other computing components, etc., and/or other conditions.

In some implementations, the data associated with the vehicle 104 can be indicative of at least one of a future action to be performed by the vehicle 104, a future geographic area in which the vehicle 104 is to be located, or a weather condition to be experienced by the vehicle 104. For example, the data associated with the vehicle 104 can include data indicative of a motion plan 134 of the vehicle 104 (e.g., that indicates one or more future vehicle actions to be performed by the vehicle 104). Additionally, or alternatively, the data associated with the vehicle 104 can include the map data 120. As described herein, the map data 120 can be indicative of current and/or future geographic area in which the vehicle 104 is/is to be located, information associated with a particular travel way, etc. The data associated with the vehicle 104 can include the weather data 121. The weather data can be indicative of current and/or future weather condition(s) that may be experienced by the vehicle 104 (and/or a particular geographic area). In some implementations, the data associated with the vehicle 104 can include the sensor data 118. The sensor data 118 can be indicative of the surrounding environment of the vehicle 104 and the objects located therein. The data associated with the vehicle 104 can include other types of data.

The vehicle computing system 102 can be configured to identify the one or more vehicle parameters 140 associated with the vehicle 104 based at least in part on the data associated with the vehicle 104. For instance, the vehicle computing system 102 can process this data to determine whether certain vehicle parameters exist (or will exist) such that one or more systems onboard the vehicle 104 can be modified (e.g., to a reduced power state, to a reduced heat generation state, etc.). For example, the vehicle computing system 102 can process the data indicative of the vehicle's current operating conditions to determine vehicle parameter(s) 140 such as a current state (e.g., speed, heading, acceleration, etc.) of the vehicle 104, a temperature of vehicle components/computing devices (e.g., sensors, processors, etc.), and/or other parameter(s). The vehicle computing system 102 can process the data indicative of the motion plan 134 of the vehicle 104 to determine vehicle parameter(s) 140 such as a future vehicle action to be performed by the vehicle 104. The future vehicle action can include, for example, a future vehicle action that decreases the speed of the vehicle 104, a future vehicle action that changes a heading of the vehicle 104 (e.g., a turn), a future stopping action, a future pull over action to provide a vehicle service (e.g., transportation service, a courier service, a delivery service, etc.), and/or other future vehicle actions.

The vehicle computing system 102 can identify a future vehicle speed, heading, acceleration, location, etc. based at least in part on the future vehicle action (e.g., a pull over action for a transportation service, turn, etc.). In another example, the vehicle computing system 102 can process the map data 120 to determine vehicle parameter(s) 140 such as, for example, current and/or future: travel way condition(s) (e.g., obstructions, roadwork, etc.), travel way type (e.g., urban city streets, rural highway, etc.), travel way geometry (e.g., slope, curvature, etc.), crowd density, traffic pattern(s), and/or other vehicle parameters indicated by the map data 120. Additionally, or alternatively, the vehicle computing system 102 can process the weather data 121 to determine vehicle parameter(s) 140 such as the weather conditions that the vehicle 104 is currently experiencing and/or will experience as a future point in time. In some implementations, the vehicle computing system 102 can process the sensor data 118 to identify one or more vehicle parameters 140 (e.g., road type, road conditions, weather conditions, etc.) and/or other vehicle parameter(s).

The vehicle computing system 102 can be configured to determine a modification to one or more operating characteristics of the one or more systems onboard the vehicle 104 based at least in part on the one or more vehicle parameters 140. Such a modification can be determined while the vehicle 104 is in motion (e.g., travelling for a vehicle service). The modification can aim to reduce the heat generation of the respective system by adjusting one or more of the operating characteristics of that system. In some implementations, this can include an adjustment to how the system's functions are operated (e.g., via a software modification), rather than a physical adjustment of the system hardware. In some implementations, the physical operating characteristics (e.g., spin rate) of the respective system (e.g., LIDAR system) can be modified (e.g., in real-time, near real-time, etc.). The modification can, for example, throttle data collection and/or data analysis. The modification can cause a decrease in power consumption by that system.

In some implementations, the vehicle computing system 102 can include an algorithm (e.g., a rule(s)-based algorithm) that is stored in an accessible memory onboard the vehicle 104. The vehicle parameter(s) 140 can be provided as input into the algorithm. The algorithm can indicate which of the system(s) onboard the vehicle 104 should be modified (e.g., to reduce that system's power consumption) and how the respective system(s) should be modified (e.g., which operating characteristics to modify) based at least in part on the one or more vehicle parameter 140.

Figure 2:
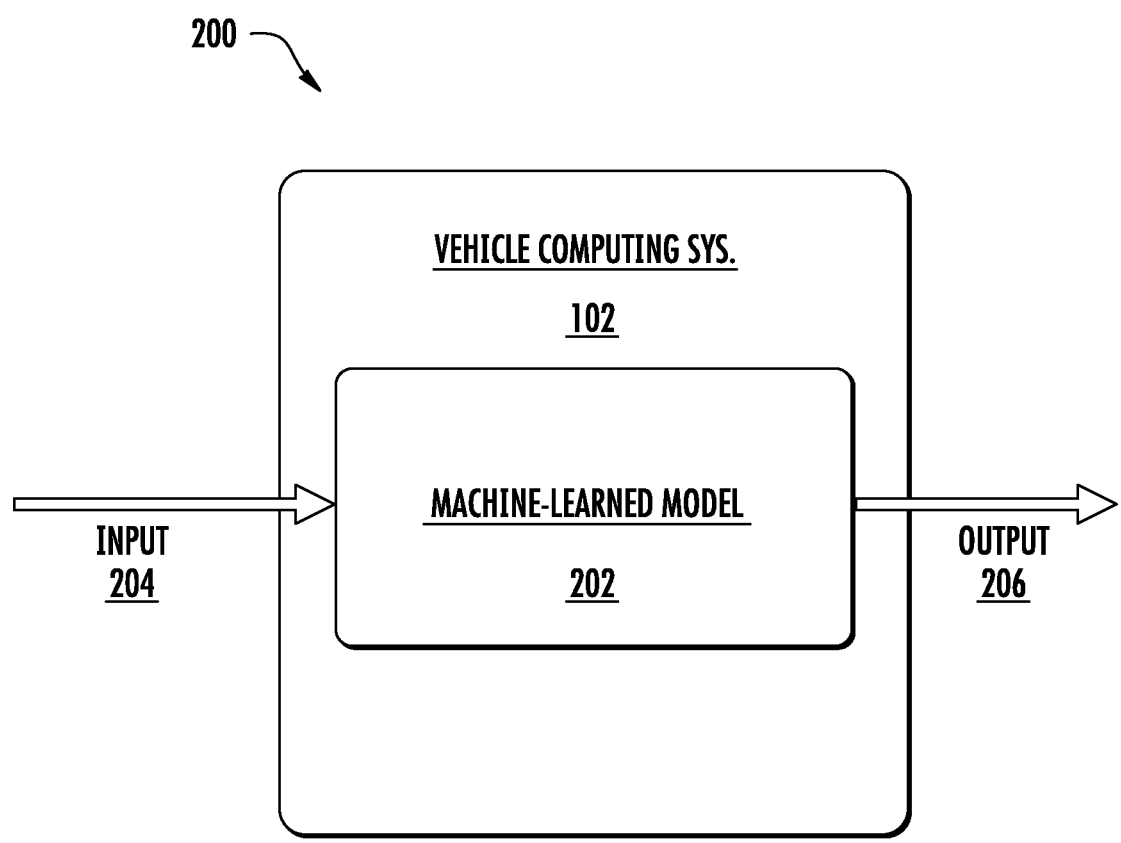
FIG. 2 depicts an example implementation of a model according to example embodiments of the present disclosure.

In some implementations, the modification to the one or more operating characteristics of a system onboard the vehicle 104 can be determined at least in part from a model, such as a machine-learned model. For example, FIG. 2 depicts an example implementation 200 of a model 202 according to example embodiments of the present disclosure. The vehicle computing system can include, employ, and/or otherwise leverage the model 202 to help determine a modification to one or more operating characteristics of one or more systems onboard the vehicle 104. In particular, the model 202 can be a machine-learned model. For example, the machine-learned model can be or can otherwise include one or more various model(s) such as, for example, neural networks (e.g., deep neural networks), or other multi-layer non-linear models. The machine-learned model can include neural networks such as, for example, a convolutional neural networks, recurrent neural networks (e.g., long short-term memory recurrent neural networks), feed-forward neural networks, and/or other forms of neural networks.

The model 202 can be trained to determine a modification to one or more operating characteristics of a system onboard the vehicle 104. For instance, training techniques (e.g., supervised training techniques) can be performed to train the model 202 to determine which operating characteristics of which systems to modify. By way of example, the model 202 can be trained based on, for example, a number of sets of data from previous events (e.g., previous logs of vehicle operations). The training data can be associated with a data recorded from previously modified systems and operating characteristics (e.g., which were modified for power consumption/thermal management). The training data can allow the model 202 to be trained to determine which systems and types of modifications were most effective in controlling the temperature of the vehicle 104 (e.g., via the heat generated by the vehicle system(s)). The model can be trained based on training data associated with the vehicle 104 and/or other vehicle(s).

The model 202 can be configured to receive input data 204 and provide output data 206 based at least in part on the input data 204. For example, the input data 204 for the model 202 can include the vehicle parameters 140, as described herein. The vehicle computing system 102 can obtain data indicative of a model 202 (e.g., machine-learned model) from an accessible memory located onboard the vehicle 104. The vehicle computing system 102 can provide input data 204 to the model 202. The model 202 can provide, as an output, output data 206 indicative of one or more recommended modifications to one or more operating characteristics of one or more systems onboard the vehicle 104.

The vehicle computing system 102 can determine a modification of the operating characteristic(s) of an onboard system for current and/or future implementation on the vehicle 104. The modification can be determined while the vehicle 104 is in motion (e.g., rather than when parked). The one or more systems onboard the vehicle 104 can include at least one of the sensor system 111 of the vehicle 104 or the motion planning system 128 of the vehicle 104. Additionally, or alternatively, the modification can be associated with another system onboard the vehicle 104.

In some implementations, the vehicle computing system 102 can determine a current modification for a system onboard the vehicle 104 based at least in part on the current operating conditions of the vehicle 104. By way of example, the vehicle computing system 102 can determine that the vehicle's current speed is decreasing and/or below a threshold and that the vehicle 104 is travelling in a geographic area with a low crowd density (e.g., in a rural environment without pedestrians). The vehicle computing system 102 can determine that the vehicle 104 can safely operate below the maximum capability of the sensor system 111 based at least in part on such vehicle parameter(s) 140. Accordingly, the vehicle computing system 102 can determine a modification to one or more operating characteristics of the sensor system 111. The operating characteristic(s) of the sensor system 111 can include, for example, data acquisition characteristics (e.g., associated with the collection of the sensor data 118 by a sensor 112) and/or data processing characteristics (e.g., associated with the processing of the sensor data 118). For instance, the vehicle computing system 102 can determine (e.g., using the rule(s)-based algorithm, model 202, etc.) that one or more of the sensors 118 (e.g., cameras) should be modified to utilize a lower frame rate and/or acquire sensor data 118 a lower rate. This can allow the sensor system 111 to consume less power for image acquisition/processing and, ultimately, to generate less heat.

In another example, the modification to the sensor system can include a modification to the physical operating characteristic(s) of the sensor system. For example, a sensor (e.g., spinning LIDAR sensor) can be modified to reduce the spin rate of the sensor (e.g., from 10 Hz to 5 Hz). Additionally, or alternatively, the modification can include a reduction (e.g., by one half) in the firing rate of the sensor's emissions (e.g., lasers). This can lead to a reduction in the frequency of emissions for the same resolution sensor frames. Moreover, this can lead to a significant impact on the permissible ambient temperature for sensor operation.

Figure 3A:
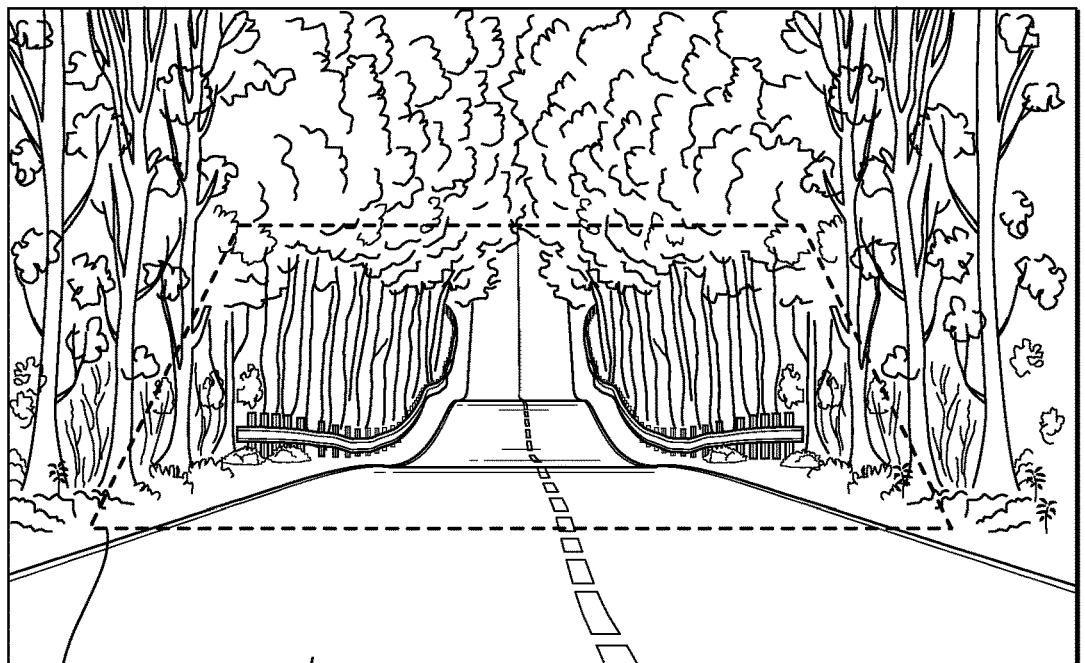
FIGS. 3A and 3B depict example environments of an autonomous vehicle according to example embodiments of the present disclosure.
Figure 3B:
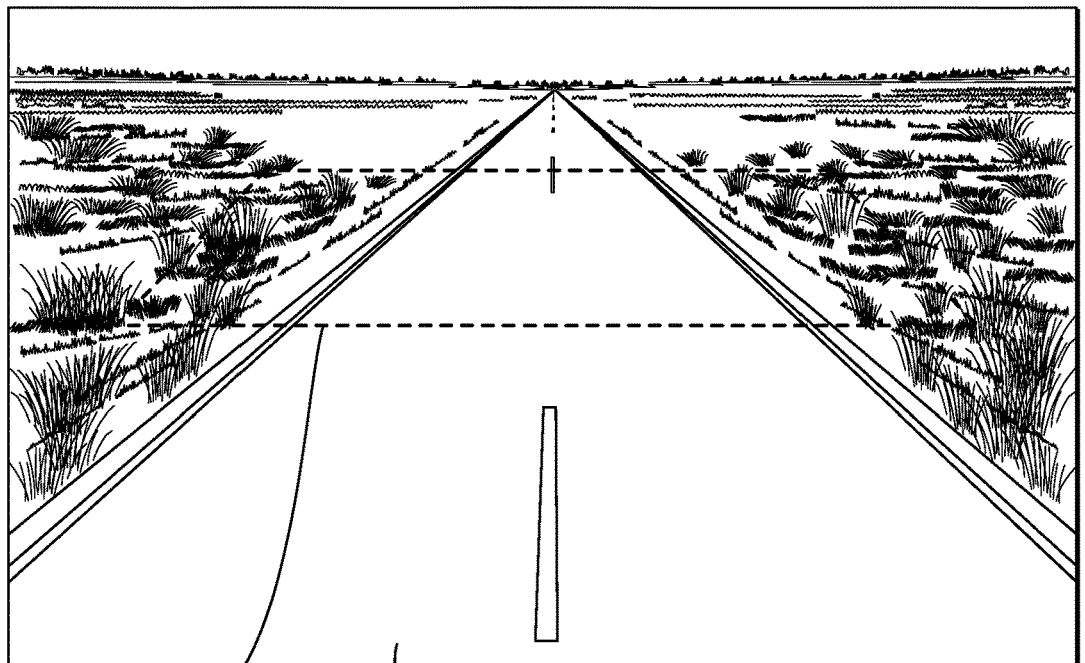

In another example, the vehicle computing system 102 can determine that the vehicle 104 is currently travelling on a relatively hilly travel way 302, as shown for example in the example environment 300 of vehicle 104 in FIG. 3A. Due to the type of travel way 302, the vehicle computing system 102 can determine that a window of interest 304 of the sensor system 111 should not be decreased such that the vehicle 104 can accurately perceive the travel way 302 (and its change in elevation). In such a case, the vehicle computing system 102 would refrain from modifying the window of interest of the sensor system 111 (e.g., to reduce power consumption, heat generation, etc. of the sensor system 111). The vehicle 104 may eventually begin travelling on a relatively flat travel way 322 of the example environment 320 of the vehicle 104 as shown in FIG. 3B. The vehicle computing system 102 can determine a modification to the operating characteristic(s) of the sensor system 111 to cause a decrease in the heat generation of the sensor system 111 while the vehicle 104 is on the flat travel way 322. For example, the vehicle computing system 102 can determine that the sensors 112 can utilize a smaller window of interest 304 (e.g., +/−two degrees) for the flat travel way 322, while still maintaining safe operation of the vehicle 104. Accordingly, the vehicle computing system 102 can determine a modification to the operating characteristic(s) of the sensor system 111 that includes adjusting the window of interest 304 of a sensor 112 of the sensor system 111. The reduced window of interest 304 can allow the sensor system 111 to process less sensor data 118 (e.g., image data), decrease the power consumed for such processing and, thus, decrease heat generation.

Figure 4:
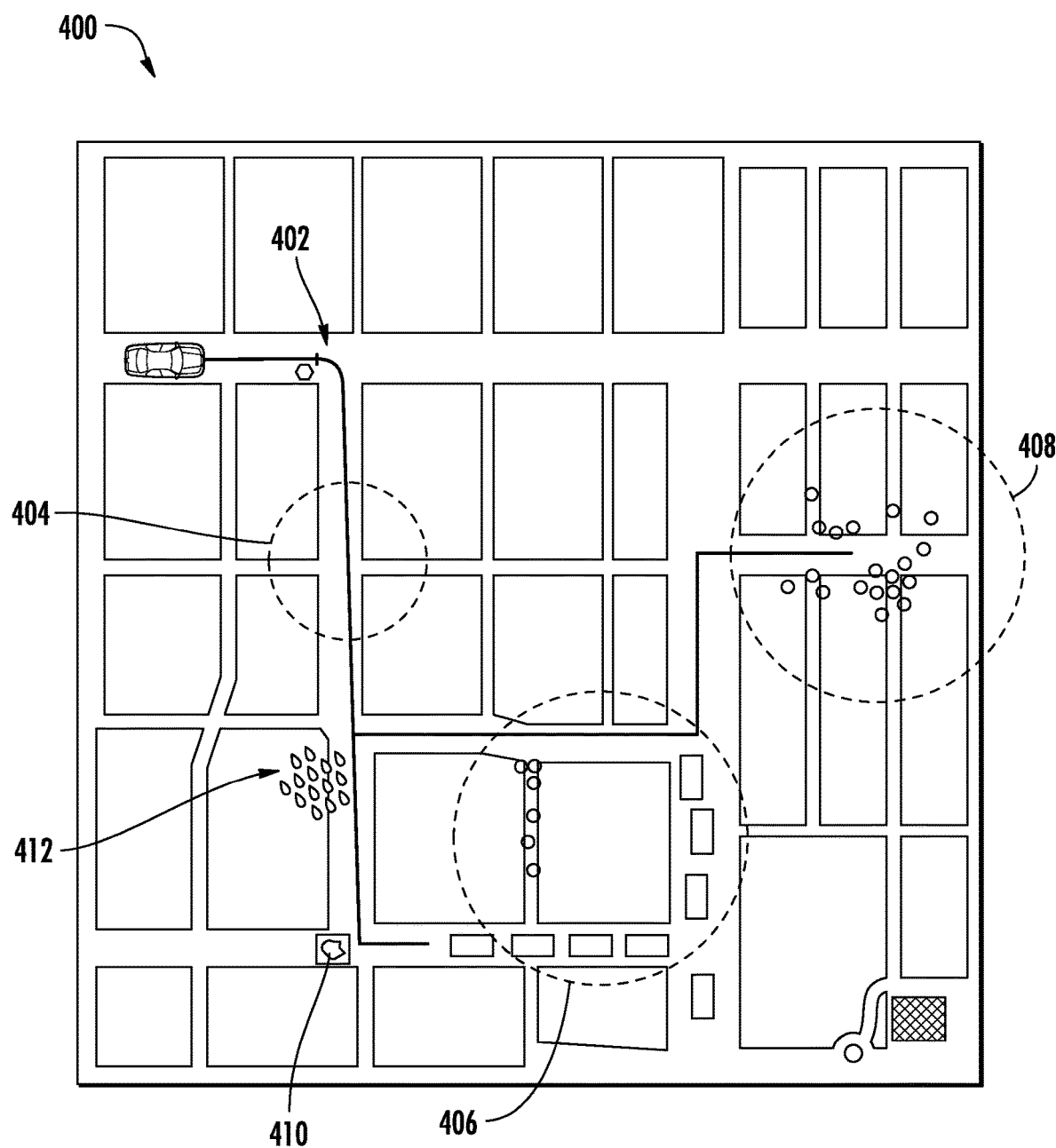
FIG. 4 depicts example geographic areas according to example embodiments of the present disclosure.

In some implementations, the vehicle computing system 102 can predictively reduce the power consumption of a system of the vehicle 104 based on future conditions that are expected by the vehicle 104. FIG. 4 depicts a diagram 400 of geographic areas according to example embodiments of the present disclosure. By way of example, the vehicle computing system 102 can determine, at a first point in time, that the vehicle 104 will decelerate to a stopped position 402 (e.g., at a stop sign) at a second, future point in time (e.g., occurring after the first point in time) based at least in part on the motion plan 134 (e.g., which indicates the future stopping action). The vehicle computing system 102 can preemptively determine that as the vehicle 104 decelerates and/or reaches the stopped position the operating characteristic(s) of the sensor system 111 of the vehicle 104 can be modified to control the heat generated by the sensor system 111. For example, the vehicle computing system 102 can determine that once the vehicle 104 eventually reaches a certain location, point in time, speed, etc. the sensor system 111 can sub-sample the sensor data 118 to decrease the power needed for data processing. In some implementations, the vehicle computing system 102 can determine that one or more of the sensors 112 can be disabled (e.g., turned-off and/or otherwise prevented from acquiring sensor data 118). These modifications in operating characteristic(s) of the sensor system 111 can lead to less heat generation from the sensor system 111.

In another example, the vehicle computing system 102 can determine that the vehicle 104 will be located within a future geographic area/location 404 that has a low level of traffic and a low crowd density based at least in part on the data associated with the vehicle 104 (e.g., the map data 120, motion plan 134, a vehicle route, etc.). Accordingly, the vehicle computing system 102 can determine a modification to the operating characteristic(s) of the sensor system 111 of the vehicle 104 to be implemented when the vehicle 104 is within the future geographic area 404, so that the sensor system 111 consumes less power (and generates less heat). The modification of the one or more operating characteristics of the sensor system 111 can include, for example, at least one of adjusting an acquisition of sensor data 118 (e.g., image data) by a sensor 112, adjusting a window of interest 304 associated with the sensor 112, sub-sampling sensor data 118 acquired via a sensor 112, reducing the resolution of the sensor data 118 acquired via a sensor 112, reducing a motion rate (e.g., spin rate) of a sensor 112, reducing emission frequency (e.g., laser firing rate) of a sensor 112, or disabling a sensor 112. Additionally, or alternatively, the vehicle computing system 102 can determine that the vehicle 104 will be located within a future geographic area 406, 408 that has a higher level of traffic and/or a higher crowd density (e.g., based at least in part on the map data 120, motion plan 134, etc.). Accordingly, the vehicle computing system 102 can determine that the sensor system 111 should not be modified while in the future geographic areas 406, 408 so that the vehicle 104 can operate to the maximum capability of the sensors 112. In another example, the vehicle computing system 102 can process the data associated with the vehicle 104 (e.g., motion plan 134, map data 120) to determine that the vehicle 104 will travel within proximity of an obstruction 410 in a travel way. As such, the vehicle computing system 102 can determine that the sensor system 111 should not be modified as the vehicle 104 attempts to traverse the obstruction 410.

In some implementations, the sensor system can be modified to increase the capability of the sensor system 111. For instance, in the event that the sensors 112 run at one quarter of a max frame rate, the vehicle computing system 102 can increase the frame rate (e.g., in a high density area). The vehicle computing system could compensate for increased cooling (e.g., via the onboard cooling system) to help offset any additional heat generation.

In some implementations, the vehicle computing system 102 can identify a current and/or future weather condition 412 to be experienced by the vehicle 104. In the event that the weather condition 412 requires optimal sensor capability (e.g., wet/icy conditions, etc.), the vehicle computing system 102 can determine that the operating characteristic(s) of the sensor system 111 should not be modified to reduce power consumption under such weather conditions. In the event that the weather condition 412 does not require maximum sensor capability (e.g., clear skies) and that it would be otherwise safe to do so, the vehicle computing system 102 can determine a modification to the operating characteristic(s) of the sensor system 111 of the vehicle 104 (e.g., via acquisition frequency reduction, sub-sampling, etc.) while under such weather conditions 412. This can allow the vehicle computing system 102 to decrease the heat generation, temperature, etc. of the sensor system 111 under such circumstances.

The vehicle computing system 102 can determine modifications to systems onboard the vehicle 104 other than the sensor system 111. For instance, the vehicle computing system 102 can determine that the temperature of the vehicle's surrounding environment is ninety degrees Fahrenheit (e.g., based on a vehicle thermometer, weather data 121, etc.). In such conditions, the vehicle computing system 102 may determine a modification that reduces the frame-rate and/or implements sub-sampling by the sensor system 111. Additionally, or alternatively, the vehicle computing system 102 can determine a modification to one or more operating characteristics of the motion planning system 128. The operating characteristic(s) of the motion planning system 128 can be characteristic(s) associated with the determination of the vehicle's motion (e.g., one future vehicle action(s)). For example, a modification of the operating characteristic(s) can include restricting the top speed of the vehicle 104 while the vehicle 104 is operating at the reduced frame rate, sub-sampling, etc. The modification of the one or more operating characteristics can include adjusting of the cost data utilized by the motion planning system 128 when planning the motion of the vehicle 104. For instance, the cost data can be adjusted such that the cost of exceeding the restricted speed is very high. In another example, the vehicle 104 may only have enough thermal headway to operate the sensor(s) 112 with a forward overhead of a particular distance (e.g., fifty meters). Accordingly, the vehicle computing system 102 can determine a modification to the operating characteristic(s) of the motion planning system 128 to restrict the speed of the vehicle 104 to not exceed a speed corresponding to the stopping distance at such forward overhead (e.g., twenty-five mph).

In another example, the vehicle 104 may be stopped for an extended period of time due to emergency road construction on a highway. When the vehicle 104 finally passes the roadwork, significant heat may be generated if the vehicle 104 attempts to reach the appropriate speed in a short time period (e.g., due to sensor frame rate increase, additional sensor activation, etc.). The vehicle computing system 102 can modify the operating characteristic(s) of the motion planning system 128 such that the vehicle 104 is caused to travel within a buffer speed/acceleration as the vehicle 104 is getting up to speed on the highway. This can help control the power consumption/heat generation of the other vehicle systems as the vehicle 104 reaches the appropriate speed.

The modifications to the operating characteristic(s) of a system can be configured to adjust the respective system in a variety of manners. In some implementations, the operating characteristic(s) of the system(s) onboard the vehicle 104 can be modified in a proportional manner. By way of example, in the event that the speed of the vehicle 104 is decreasing (or will be decreasing), the frame rate of a sensor 112 can be decreased proportionally to the decrease in vehicle speed. In some implementations, the operating characteristic(s) of the system(s) onboard the vehicle 104 can be modified in a pre-set manner. For example, in the event that the vehicle 104 is travelling (or will be travelling) below a certain speed threshold, in a certain weather condition, and/or under another circumstance for which its existence can be represented in a binary manner, the sensor system 111 can begin to sub-sample the sensor data 118, according to a pre-determined approach that defines the particular sub-sampling type, factors, resolutions, etc.

The vehicle computing system can be configured to control the heat generation of at least a portion of the vehicle 104 (e.g., the modified system) via implementation of the modification of the one or more operating characteristics of the one or more systems onboard the vehicle 104. For instance, the vehicle computing system 102 can send data indicative of the determined modification (e.g., control signal(s)) to the respective system(s) onboard the vehicle 104 (e.g., sensor system 111, motion planning system 128, etc.) to implement the modification (e.g., decrease in the frame rate, adjust a window of interest, adjust cost data, etc.). The vehicle computing system 102 can provide such data while the vehicle 104 is in motion to implement the modification while the vehicle 104 is in motion. In some implementations, the vehicle computing system 102 can provide the data indicative of the modification at a current point in time to immediately implement the modification (e.g., for the vehicle's current situation). In some implementations, the vehicle computing system 102 can provide the data indicative of the modification to the one or more systems at a future point in time (e.g., approaching a future stop, flat travel way, low crowd density area, etc.). For example, the vehicle computing system 102 can determine a modification while the vehicle 104 is in a first geographic area and implement the modification when the vehicle 104 is in a second geographic area.

In some implementations, a future modification of the systems onboard the vehicle 104 can be based on the current parameters of the vehicle 104. For instance, the vehicle computing system 102 can determine that the vehicle 104 will enter into an area with low crowd density, low traffic, flat terrain, etc. at some future point in time that will allow the operating characteristics of the sensor system 111 to be modified (e.g., to reduce heat generation). Accordingly, the vehicle computing system 102 can determine that the sensor system 112 may currently operate in a manner that generates a higher amount of heat based on the determination that the operating characteristic(s) of the sensor system 111 can be modified in the future to reduce heat generation. In another example, the vehicle computing system 102 can determine that the vehicle 104 is currently travelling in an area with low crowd density, low traffic, flat terrain, etc. that allows the operating characteristics of the sensor system 111 to be modified (e.g., to reduce heat generation), but that the vehicle 104 will be travelling in an crowded, high traffic area, that may require significant power consumption by the sensor system 111 (e.g., increasing heat generation). Accordingly, the vehicle computing system 102 can implement a modification to the operating characteristic(s) of the sensor system 111 to reduce heat generation at a current time, as a pre-cursor to offset the increased amount of future heat generation by the sensor system 111.

In some implementations, the system(s) of the vehicle 104 can be configured to operate in a plurality of operating modes that include, for example, a low heat operating mode (e.g., in which the system generates less heat). By way of example, the sensor system 111 can be configured to operate in a plurality of sensor operating modes that include a low heat sensor operating mode in which the sensor(s) 112 operate at a decreased frame rate, utilize sub-sampling, etc. To implement the determined modification, the vehicle computing system 102 can cause the sensor system 111 to enter into the low heat sensor operating mode.

Figure 5:
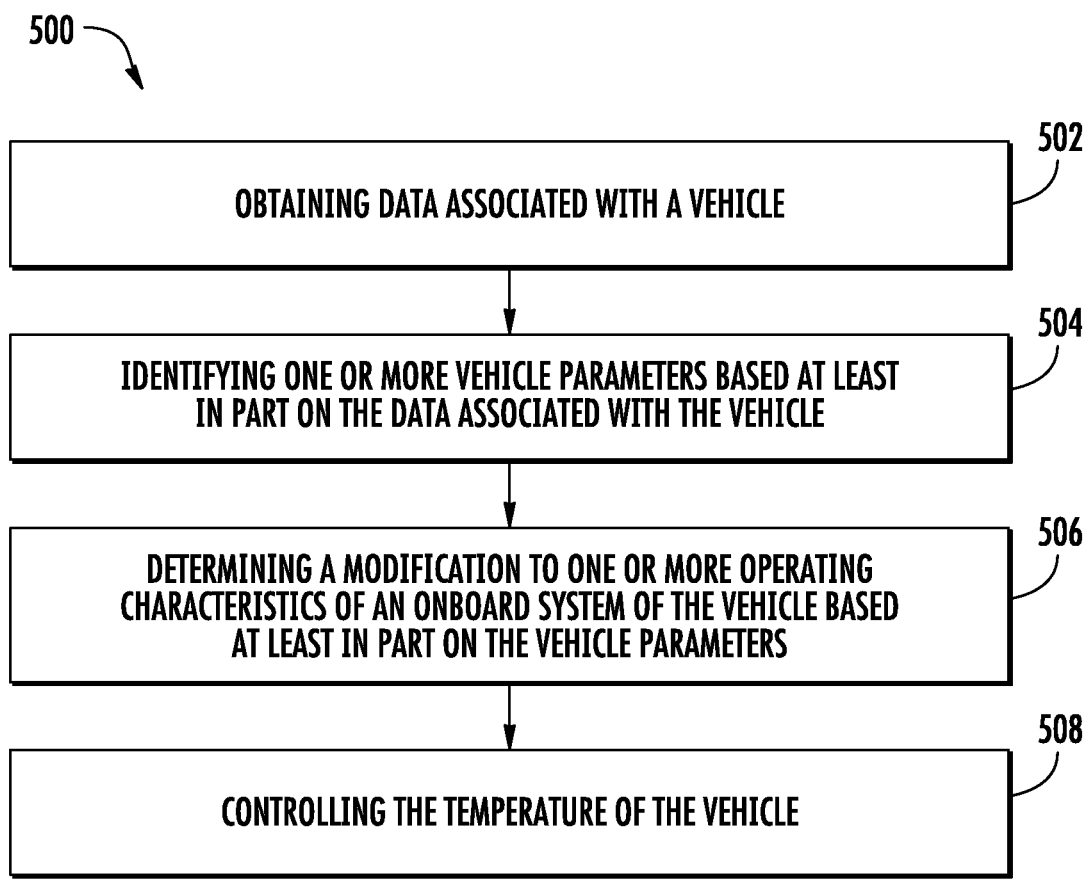
FIG. 5 depicts a flow diagram of an example method of autonomous vehicle thermal management according to example embodiments of the present disclosure.

FIG. 5 depicts a flow diagram of an example method 500 of autonomous vehicle thermal management according to example embodiments of the present disclosure. One or more portion(s) of the method 500 can be implemented by one or more computing devices such as, for example, the one or more computing device(s) of the vehicle computing system 102 and/or other systems. Each respective portion of the method 500 can be performed by any (or any combination) of the one or more computing devices. Moreover, one or more portion(s) of the method 500 can be implemented as an algorithm on the hardware components of the device(s) described herein (e.g., as in FIGS. 1 and 6), for example, to control the heat generation, power consumption, and/or temperature of an autonomous vehicle. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (502), the method 500 can include obtaining data associated with a vehicle. For instance, the vehicle computing system 102 can obtain data associated with a vehicle 104. By way of example, the vehicle computing system 102 can obtain data indicative of a motion plan 134 of the vehicle 104. The motion plan 134 can be indicative of a future vehicle action to be performed by the vehicle 104. Additionally, or alternatively, the vehicle computing system 102 can obtain map data 120 indicative of a future geographic area 404, 406, 408 in which the vehicle 104 is planning to be located at a future point in time. As described herein, the vehicle computing system 102 can obtain also, or alternatively, obtain weather data 121, sensor data 118, and/or other types of data.

At (504), the method 500 can include identifying one or more vehicle parameters based at least in part on the data associated with the vehicle. For instance, the vehicle computing system 102 can identify one or more vehicle parameters 140 associated with the vehicle 104 based at least in part on the data associated with the vehicle 104. For instance, the vehicle computing system 102 can identify the one or more vehicle parameters 140 based at least in part on the future vehicle action to be performed by the vehicle 104 (e.g., as indicated in the motion plan 134). Additionally, or alternatively, the vehicle computing system 102 can identify the one or more vehicle parameters 140 based at least in part on the future geographic area 404, 406, 408 in which the vehicle 104 is to be located (e.g., as indicated by the map data 120, motion plan 134, vehicle route, etc.). The vehicle computing system 102 can also, or alternatively, identify one or more vehicle parameters 140 based at least in part on the weather data 121, the sensor data 118, and/or other types of data.

As described herein, the vehicle parameter(s) 140 can be indicative of a variety of information. For example, the one or more vehicle parameters 140 can be indicative of at least one of: a speed of the vehicle 104, a condition of a travel way, a type of the travel way, a geometry of a travel way, a crowd density (e.g., associated with a future geographic area 404, 406, 408), a traffic pattern, (e.g., associated with a future geographic area 404, 406, 408), a future vehicle action (and/or the heading, speed, acceleration, etc. associated therewith), or the weather condition (associated with a future geographic area 404, 406, 408). In some implementations, the one or more vehicle parameters 140 can be indicative of other types of vehicle parameters.

At (506), the method 500 can include determining a modification to one or more operating characteristics of an onboard system of the vehicle based at least in part on the vehicle parameters. The vehicle computing system 102 can determine a modification to one or more operating characteristics of one or more systems onboard the vehicle 104 based at least in part on the one or more vehicle parameters 140. As described herein, the vehicle computing system 102 can determine the modification of the one or more operating characteristics based at least in part on the one or more vehicle parameters 140 and at least one of a rule-based algorithm or a model 202 (e.g., a machine-learned model). For instance, the vehicle computing system 102 can access the rule-based algorithm and/or the model 202 from an accessible memory onboard the vehicle 104 (and/or from a memory that is remote from the vehicle 104). The vehicle computing system 102 can input the vehicle parameters 140 into the rule-based algorithm and/or the model 202. The vehicle computing system 102 can obtain, as an output from the rule-based algorithm and/or the model 202, a modification of one or more operating characteristics of one or more systems onboard the vehicle 104.

In some implementations, the vehicle computing system 102 can determine a modification to one or more operating characteristics of a sensor system 111 of the vehicle 104 based at least in part on the one or more vehicle parameters 140. In some implementations, the modification can cause a decrease in a power consumption of the sensor system 111. For instance, the modification to the one or more operating characteristics of the sensor system 111 of the vehicle 104 can include a decrease in a frame rate of a sensor 112 of the sensor system 111. Additionally, or alternatively, the modification to the one or more operating characteristics of the sensor system 111 of the vehicle 104 can include sub-sampling sensor data 118 obtained via the sensor system 111. The modification can include a reduction in the data collection and/or processing of the collection of data (e.g., by providing some data during processing). By way of example, the vehicle computing system can determine one or more vehicle parameters such as a current and/or future speed of the vehicle 104. The vehicle computing system 102 can determine a modification to the sensor system 111 based on the vehicle parameters. The modification can include a decrease (and/or increase) in a spin rate, emission frequency, frame rate, sub-sampling, etc. of the sensor system. The vehicle computing system 102 can implement the modification as the vehicle 104 is travelling (e.g., a decrease/increase in spin rate, emission frequency, frame rate, sub-sampling, etc. in proportion to the vehicle speed decrease/increase).

In some implementations, the operating characteristic(s) of another system of the vehicle 104 can be modified. For instance, the vehicle computing system 102 can determine a modification to one or more operating characteristics of a motion planning system 128 of the vehicle 104 based at least in part on the one or more vehicle parameters 140. The modification the one or more operating characteristics of the motion planning system 128 can include, for example, a restriction on a speed of the vehicle 104.

At (508), the method 500 can include controlling the temperature of the vehicle. The vehicle computing system 102 can control a heat generation of at least a portion of the vehicle 104 (e.g., the respective system and the portions of the vehicle 104 affected by the respective system's heat generation) via implementation of the modification of the one or more operating characteristics of the one or more systems onboard the vehicle 104. By way of example, the vehicle computing system 102 can control a heat generation of at least a portion of the vehicle 104 via implementation of the modification of the one or more operating characteristics of the sensor system 111 of the vehicle 104. This can help control the temperature of the sensor system 111 as well as the portions of the vehicle 104, if any, that are affected by the heat generated by the sensor system 111. Additionally, or alternatively, the vehicle computing system 102 can control the heat generation of at least the portion of the vehicle 104 via the implementation of the modification to the one or more operating characteristics of the motion planning system 128 of the vehicle, as described herein.

In some implementations, the modification to the operating characteristic(s) of a system onboard the vehicle 104 can include the respective system adjusting from a first mode to a second mode in which the system is configured to generate less heat (e.g., due to less power consumption). For example, the sensor system 111 can be configured to operate in a plurality of sensor operating modes. The plurality of sensor operating modes can include a low heat sensor operating mode in which the sensor system 111 generates less heat (e.g., than in one or more other operating modes). While in the low heat sensor operating mode, the sensor system 111 can implement one or more of the modifications (e.g., frame-rate reduction, resolution reduction, sub-sampling, etc.) to reduce the power consumption and heat generation of the sensor system. The vehicle computing system 102 can control the temperature of at least a portion of the vehicle 104 by causing the sensor system 111 to enter into the low heat sensor operating mode.

Figure 6:
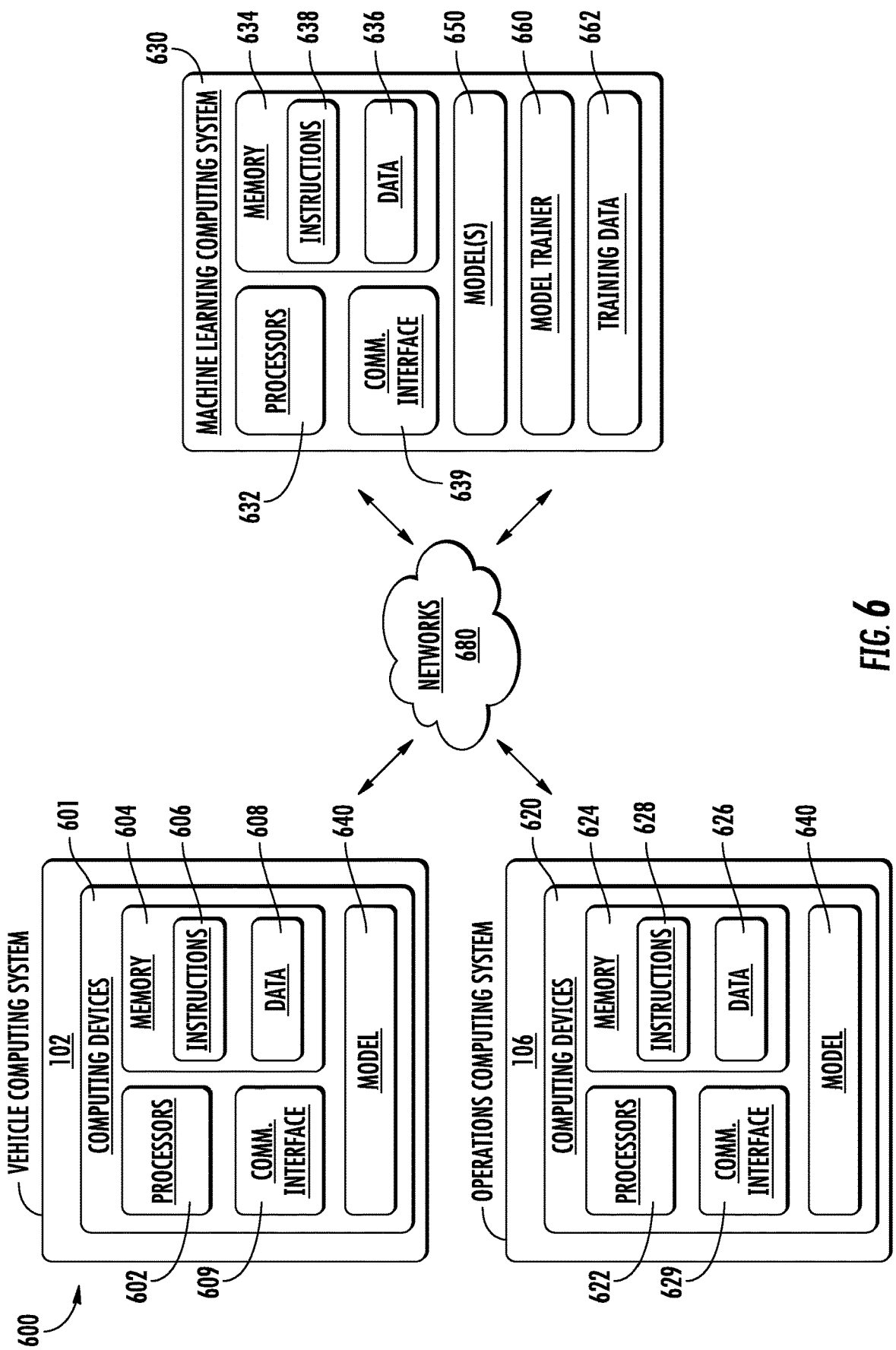
FIG. 6 depicts example system components according to example embodiments of the present disclosure.

FIG. 6 depicts example system components of an example system 600 according to example embodiments of the present disclosure. The example system 600 can include the vehicle computing system 102, the operations computing system 106, and a machine learning computing system 630 that are communicatively coupled over one or more network(s) 680.

The vehicle computing system 102 can include one or more computing device(s) 601. The computing device(s) 601 of the vehicle computing system 102 can include processor(s) 602 and a memory 604 (e.g., onboard the vehicle 104). The one or more processors 602 can be any suitable processing device (e.g., a processor core, a microprocessor, an ASIC, a FPGA, a controller, a microcontroller, etc.) and can be one processor or a plurality of processors that are operatively connected. The memory 604 can include one or more non-transitory computer-readable storage media, such as RAM, ROM, EEPROM, EPROM, one or more memory devices, flash memory devices, etc., and combinations thereof.

The memory 604 can store information that can be accessed by the one or more processors 602. For instance, the memory 604 (e.g., one or more non-transitory computer-readable storage mediums, memory devices) can include computer-readable instructions 606 that can be executed by the one or more processors 602. The instructions 606 can be software written in any suitable programming language or can be implemented in hardware. Additionally, or alternatively, the instructions 606 can be executed in logically and/or virtually separate threads on processor(s) 602.

For example, the memory 604 can store instructions 606 that when executed by the one or more processors 602 cause the one or more processors 602 (the computing system 102) to perform operations such as any of the operations and functions of the vehicle computing system 102, the vehicle 104, or for which the vehicle computing system 102 and/or the vehicle 104 are configured, as described herein, the operations for power consumption and thermal management of an autonomous vehicle (e.g., one or more portions of method 500), and/or any other functions for the vehicle computing system 102, as described herein.

The memory 604 can store data 608 that can be obtained, received, accessed, written, manipulated, created, and/or stored. The data 608 can include, for instance, sensor data, state data, predicted data, motion planning data, data indicative of rule-based algorithms (e.g., for determining modifications), data indicative of machine-learned models (e.g., for determining modifications), map data, weather data, other data associated with geographic area(s), data indicative of vehicle parameter(s), data indicative of operating characteristic(s) of the system(s) onboard the vehicle, data indicative of modification(s) of the operating characteristic(s), input data, data indicative of machine-learned model(s) (e.g., for determining modifications), data indicative of model outputs, and/or other data/information described herein. In some implementations, the computing device(s) 601 can obtain data from one or more memory device(s) that are remote from the vehicle 104.

The computing device(s) 601 can also include a communication interface 609 used to communicate with one or more other system(s) on-board the vehicle 104 and/or a remote computing device that is remote from the vehicle 104 (e.g., the other systems of FIG. 6, etc.). The communication interface 609 can include any circuits, components, software, etc. for communicating via one or more networks (e.g., 680). In some implementations, the communication interface 609 can include, for example, one or more of a communications controller, receiver, transceiver, transmitter, port, conductors, software and/or hardware for communicating data/information.

The operations computing system 106 can perform the operations and functions for managing vehicles (e.g., a fleet of autonomous vehicles) and/or otherwise described herein. The operations computing system 106 can be located remotely from the vehicle 104. For example, the operations computing system 106 can operate offline, off-board, etc. The operations computing system 106 can include one or more distinct physical computing devices.

The operations computing system 106 can include one or more computing devices 620. The one or more computing devices 620 can include one or more processors 622 and a memory 624. The one or more processors 622 can be any suitable processing device (e.g., a processor core, a microprocessor, an ASIC, a FPGA, a controller, a microcontroller, etc.) and can be one processor or a plurality of processors that are operatively connected. The memory 624 can include one or more non-transitory computer-readable storage media, such as RAM, ROM, EEPROM, EPROM, one or more memory devices, flash memory devices, etc., and combinations thereof.

The memory 624 can store information that can be accessed by the one or more processors 622. For instance, the memory 624 (e.g., one or more non-transitory computer-readable storage mediums, memory devices) can store data 626 that can be obtained, received, accessed, written, manipulated, created, and/or stored. The data 626 can include, for instance, data indicative of model(s), map data, weather data, data associated with geographic area(s), and/or other data or information described herein. In some implementations, the operations computing system 106 can obtain data from one or more memory device(s) that are remote from the operations computing system 106.

The memory 624 can also store computer-readable instructions 628 that can be executed by the one or more processors 622. The instructions 628 can be software written in any suitable programming language or can be implemented in hardware. Additionally, or alternatively, the instructions 628 can be executed in logically and/or virtually separate threads on processor(s) 622. For example, the memory 624 can store instructions 628 that when executed by the one or more processors 622 cause the one or more processors 622 to perform any of the operations and/or functions of the operations computing system 106 and/or other operations and functions.

The computing device(s) 620 can also include a communication interface 629 used to communicate with one or more other system(s). The communication interface 629 can include any circuits, components, software, etc. for communicating via one or more networks (e.g., 680). In some implementations, the communication interface 629 can include for example, one or more of a communications controller, receiver, transceiver, transmitter, port, conductors, software and/or hardware for communicating data/information.

According to an aspect of the present disclosure, the vehicle computing system 102 and/or the operations computing system 106 can store or include one or more machine-learned models 640. As examples, the machine-learned models 640 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), or other forms of neural networks. The machine-learned models 640 can include the model 202, as described herein.

In some implementations, the vehicle computing system 102 and/or the operations computing system 106 can receive the one or more machine-learned models 640 from the machine learning computing system 630 over the network(s) 680 and can store the one or more machine-learned models 640 in the memory of the respective system. The vehicle computing system 102 and/or the operations computing system 106 can use or otherwise implement the one or more machine-learned models 640 (e.g., by processor(s) 602, 622). In particular, the vehicle computing system 102 and/or the operations computing system 106 can implement the machine learned model(s) 640 to determine a modification to one or more operating characteristics of a system onboard a vehicle, as described herein.

The machine learning computing system 630 can include one or more processors 632 and a memory 634. The one or more processors 632 can be any suitable processing device (e.g., a processor core, a microprocessor, an ASIC, a FPGA, a controller, a microcontroller, etc.) and can be one processor or a plurality of processors that are operatively connected. The memory 634 can include one or more non-transitory computer-readable storage media, such as RAM, ROM, EEPROM, EPROM, one or more memory devices, flash memory devices, etc., and combinations thereof.

The memory 634 can store information that can be accessed by the one or more processors 632. For instance, the memory 634 (e.g., one or more non-transitory computer-readable storage mediums, memory devices) can store data 636 that can be obtained, received, accessed, written, manipulated, created, and/or stored. In some implementations, the machine learning computing system 630 can obtain data from one or more memory devices that are remote from the machine learning computing system 630.

The memory 634 can also store computer-readable instructions 638 that can be executed by the one or more processors 632. The instructions 638 can be software written in any suitable programming language or can be implemented in hardware. Additionally, or alternatively, the instructions 638 can be executed in logically and/or virtually separate threads on processor(s) 632. The memory 634 can store the instructions 638 that when executed by the one or more processors 632 cause the one or more processors 632 to perform operations. The machine learning computing system 630 can include a communication system 639, including devices and/or functions similar to that described with respect to the vehicle computing system 102 and/or the operations computing system 106.

In some implementations, the machine learning computing system 630 can include one or more server computing devices. If the machine learning computing system 630 includes multiple server computing devices, such server computing devices can operate according to various computing architectures, including, for example, sequential computing architectures, parallel computing architectures, or some combination thereof.

In addition or alternatively to the model(s) 640 at the vehicle computing system 102 and/or the operations computing system 106, the machine learning computing system 630 can include one or more machine-learned models 650. As examples, the machine-learned models 650 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks, or other forms of neural networks. The machine-learned models 650 can be similar to and/or the same as the machine-learned models 640.

As an example, the machine learning computing system 630 can communicate with the vehicle computing system 102 and/or the operations computing system 106 according to a client-server relationship. For example, the machine learning computing system 630 can implement the machine-learned models 650 to provide a web service to the vehicle computing system 102 and/or the operations computing system 106. For example, the web service can provide machine-learned models to an entity associated with an autonomous vehicle; such that the entity can implement the machine-learned model (e.g., to determine modification(s) to operating parameter(s) of system(s), etc.). Thus, machine-learned models 650 can be located and used at the vehicle computing system 102 and/or the operations computing system 106 and/or machine-learned models 650 can be located and used at the machine learning computing system 630.

In some implementations, the machine learning computing system 630, the vehicle computing system 102, and/or the operations computing system 106 can train the machine-learned models 640 and/or 650 through use of a model trainer 660. The model trainer 660 can train the machine-learned models 640 and/or 650 using one or more training or learning algorithms. One example training technique is backwards propagation of errors. In some implementations, the model trainer 660 can perform supervised training techniques using a set of labeled training data. In other implementations, the model trainer 660 can perform unsupervised training techniques using a set of unlabeled training data. The model trainer 660 can perform a number of generalization techniques to improve the generalization capability of the models being trained. Generalization techniques include weight decays, dropouts, or other techniques.

In particular, the model trainer 660 can train a machine-learned model 640 and/or 650 based on a set of training data 662. The training data 662 can include, for example, a number of sets of data from previous events (e.g., previous event logs indicative of power consumption and/or heat generation). The training data 662 can be associated with a previous event associated with controlling the temperature of the vehicle, controlling system power consumption, etc. and can allow the training data 662 to train a model based on real-world events and the data associated therewith. In some implementations, the training data 662 can be taken from the same vehicle as that which utilizes that model 640/650. In this way, the models 640/650 can be trained to determine outputs (e.g., modification(s) of operating characteristic(s)) in a manner that is tailored to that particular vehicle. Additionally, or alternatively, the training data 662 can be taken from one or more different vehicles that that which is utilizing that model 640/650. The model trainer 660 can be implemented in hardware, firmware, and/or software controlling one or more processors.

The network(s) 680 can be any type of network or combination of networks that allows for communication between devices. In some embodiments, the network(s) 680 can include one or more of a local area network, wide area network, the Internet, secure network, cellular network, mesh network, peer-to-peer communication link and/or some combination thereof and can include any number of wired or wireless links. Communication over the network(s) 680 can be accomplished, for instance, via a network interface using any type of protocol, protection scheme, encoding, format, packaging, etc.

FIG. 6 illustrates one example system 600 that can be used to implement the present disclosure. Other computing systems can be used as well. For example, in some implementations, the vehicle computing system 102 and/or the operations computing system 106 can include the model trainer 660 and the training dataset 662. In such implementations, the machine-learned models 640 can be both trained and used locally at the vehicle computing system 102 and/or the operations computing system 106. As another example, in some implementations, the vehicle computing system 102 and/or the operations computing system 106 may not be connected to other computing systems.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of autonomous vehicle thermal management, comprising:
   identifying one or more vehicle parameters associated with an autonomous vehicle;
   determining a modification to one or more operating characteristics of a sensor system of the autonomous vehicle based at least in part on a sensor capability requirement corresponding to the one or more vehicle parameters, wherein the sensor capability requirement is configured based at least in part on an operating condition of the autonomous vehicle; and
   controlling a heat generation of the sensor system of the autonomous vehicle via implementation of the modification.

2. The computer-implemented method of claim 1, further comprising:
   obtaining data indicative of a motion plan of the autonomous vehicle, wherein the motion plan is indicative of a future vehicle action to be performed by the autonomous vehicle, and
   wherein identifying the one or more vehicle parameters associated with the autonomous vehicle comprises identifying the one or more vehicle parameters based at least in part on the future vehicle action to be performed by the autonomous vehicle.

3. The computer-implemented method of claim 1, further comprising:
   obtaining map data indicative of a future geographic area in which the autonomous vehicle is to be located at a future point in time, and
   wherein identifying the one or more vehicle parameters associated with the autonomous vehicle comprises identifying the one or more vehicle parameters based at least in part on the future geographic area in which the autonomous vehicle is to be located.

4. The computer-implemented method of claim 3, wherein the one or more vehicle parameters are indicative of a crowd density associated with the future geographic area.

5. The computer-implemented method of claim 3, wherein the one or more vehicle parameters are indicative of a traffic pattern associated with the future geographic area.

6. The computer-implemented method of claim 1, wherein the modification to the one or more operating characteristics of the sensor system comprises a decrease in a frame rate of a sensor of the sensor system.

7. The computer-implemented method of claim 1, wherein the modification to the one or more operating characteristics of the sensor system comprises sub-sampling sensor data obtained via the sensor system.

8. The computer-implemented method of claim 1, further comprising:
   determining a modification to one or more operating characteristics of a motion planning system of the autonomous vehicle based at least in part on the one or more vehicle parameters.

9. The computer-implemented method of claim 8, wherein the modification to the one or more operating characteristics of the motion planning system comprises a restriction on a speed of the autonomous vehicle.

10. The computer-implemented method of claim 8, wherein the modification comprises, during a change in the sensor capability requirement, operating within a buffer speed or a buffer acceleration.

11. The computer-implemented method of claim 1, wherein the sensor capability requirement comprises operating the sensor system to sense at least a forward distance ahead of the autonomous vehicle, wherein the forward distance is determined based at least in part on the operating condition.

12. The computer-implemented method of claim 1, wherein the sensor capability requirement is decreased based at least in part on a decrease in speed of the autonomous vehicle.

13. A computing system for autonomous vehicle thermal management, comprising:
   one or more processors; and
   one or more tangible, non-transitory, computer readable media that collectively store instructions that when executed by the one or more processors cause the computing system to perform operations, the operations comprising:
      obtaining data associated with an autonomous vehicle, wherein the data is indicative of at least one of a future action to be performed by the autonomous vehicle, a future geographic area in which the autonomous vehicle is to be located, or a weather condition to be experienced by the autonomous vehicle;
      identifying one or more vehicle parameters associated with the autonomous vehicle based at least in part on the data associated with the autonomous vehicle;
      determining a modification to one or more operating characteristics of one or more systems onboard the autonomous vehicle based at least in part on a sensor capability requirement corresponding to the one or more vehicle parameters, wherein the sensor capability requirement is configured based at least in part on an operating condition of the autonomous vehicle, and wherein the one or more systems onboard the autonomous vehicle comprise at least one of a sensor system of the autonomous vehicle or a motion planning system of the autonomous vehicle; and
      controlling a heat generation of at least a portion of the autonomous vehicle via implementation of the modification.

14. The computing system of claim 13, wherein the modification comprises adjusting a window of interest of a sensor of the sensor system.

15. The computing system of claim 13, wherein the modification comprises adjusting cost data utilized by the motion planning system when planning a motion of the autonomous vehicle.

16. The computing system of claim 13, wherein the one or more vehicle parameters are indicative of at least one of: a speed of the autonomous vehicle, a condition of a travel way, a type of the travel way, a geometry of a travel way, other parameters indicated by map data, a crowd density, a traffic pattern, the future action, a temperature of a vehicle computing device, or the weather condition.

17. The computing system of claim 13, wherein the modification is determined at a first point in time, and wherein controlling the heat generation comprises:
   providing at a second point in time data indicative of the modification to the one or more systems.

18. An autonomous vehicle comprising:
   one or more processors; and
   one or more tangible, non-transitory, computer readable media that store instructions that when executed by the one or more processors cause the autonomous vehicle to perform operations, the operations comprising:
      obtaining data associated with the autonomous vehicle;

identifying one or more vehicle parameters associated with the autonomous vehicle based at least in part on the data associated with the autonomous vehicle;

determining a modification to one or more operating characteristics of one or more systems onboard the autonomous vehicle based at least in part on a sensor capability requirement corresponding to the one or more vehicle parameters, wherein the sensor capability requirement is configured based at least in part on an operating condition of the autonomous vehicle, and wherein the one or more systems comprise at least one of a sensor system of the autonomous vehicle or a motion planning system of the autonomous vehicle; and controlling a heat generation of at least a portion of the autonomous vehicle via implementation of the modification.

19. The autonomous vehicle of claim 18, wherein the data associated with the autonomous vehicle comprises data indicative of a motion plan of the autonomous vehicle, map data indicative of a future geographic area in which the autonomous vehicle is to be located, or weather data indicative of a weather condition to be experienced by the autonomous vehicle.

20. The autonomous vehicle of claim 18, wherein the sensor system comprises a sensor; and wherein the modification comprises at least one of: adjusting an acquisition of image data by the sensor, adjusting a window of interest associated with the sensor, subsampling image data acquired via the sensor, reducing a resolution of the image data acquired via the sensor, or disabling the sensor.

\* \* \* \* \*